US011036861B2

(12) United States Patent
Campagna et al.

(10) Patent No.: US 11,036,861 B2
(45) Date of Patent: Jun. 15, 2021

(54) HOST ATTESTATION

(71) Applicant: Amazon Technologies, Inc., Seattle, WA (US)

(72) Inventors: Matthew John Campagna, Bainbridge Island, WA (US); Gregory Alan Rubin, Seattle, WA (US); Eric Jason Brandwine, Haymarket, VA (US)

(73) Assignee: Amazon Technologies, Inc., Seattle, WA (US)

(*) Notice: Subject to any disclaimer, the term of this patent is extended or adjusted under 35 U.S.C. 154(b) by 52 days.

(21) Appl. No.: 16/298,867

(22) Filed: Mar. 11, 2019

(65) Prior Publication Data

US 2019/0205540 A1 Jul. 4, 2019

Related U.S. Application Data

(62) Division of application No. 15/389,771, filed on Dec. 23, 2016, now Pat. No. 10,229,270.

(51) Int. Cl.
*G06F 21/57* (2013.01)
*H04L 29/06* (2006.01)
(Continued)

(52) U.S. Cl.
CPC .............. *G06F 21/57* (2013.01); *G06F 21/64* (2013.01); *H04L 9/088* (2013.01); *H04L 9/0877* (2013.01);
(Continued)

(58) Field of Classification Search
CPC ....... G06F 21/57; G06F 21/64; H04L 9/0877; H04L 9/0878; H04L 9/14; H04L 9/3247; H04L 9/3263; H04L 63/067
(Continued)

(56) References Cited

U.S. PATENT DOCUMENTS 5,432,852 A 7/1995 Leighton et al.
6,701,434 B1 3/2004 Rohatgi
(Continued)

OTHER PUBLICATIONS

Bare, "Attestation and Trusted Computing," University of Washington, Washington, Mar. 2006.
(Continued)

*Primary Examiner* — Jacob Lipman
(74) *Attorney, Agent, or Firm* — Davis Wright Tremaine LLP

(57) ABSTRACT

A service provider provides virtual computing services using a fleet of one or more host computer systems. Each of the host computer systems may be equipped with a trusted platform module ("TPM"). The service provider, the host computer systems, and the virtual computing environments generate attestations that prove the integrity of the system. The attestations are signed with a one-time-use cryptographic key that is verifiable against the public keys of the service provider, a host computer system, and a virtual computing environment. The public key of the host computer system is integrated into a hash tree that links the public key of the host computer system to the public key of the service provider. The public key of the virtual computing environment is signed using a one-time-use graphic key issued to the host computer system that hosts the virtual computing environment.

20 Claims, 14 Drawing Sheets

(51) Int. Cl.
  *H04L 9/32*   (2006.01)
  *H04L 9/08*   (2006.01)
  *G06F 21/64*  (2013.01)
  *H04L 9/14*   (2006.01)

(52) U.S. Cl.
  CPC .............. *H04L 9/14* (2013.01); *H04L 9/3247* (2013.01); *H04L 9/3263* (2013.01); *H04L 63/067* (2013.01); *H04L 63/0823* (2013.01); *H04L 67/42* (2013.01); *H04L 2209/30* (2013.01)

(58) Field of Classification Search
  USPC ........................................................ 713/176
  See application file for complete search history.

(56) References Cited

U.S. PATENT DOCUMENTS

| | | | |
|---|---|---|---|
| 7,373,503 | B2 | 5/2008 | Nakano et al. |
| 9,049,185 | B1 | 6/2015 | Papadopoulos et al. |
| 2002/0107814 | A1 | 8/2002 | Micali |
| 2004/0107341 | A1 | 6/2004 | Hall et al. |
| 2005/0036615 | A1 | 2/2005 | Jakobsson et al. |
| 2005/0246552 | A1* | 11/2005 | Bade ............... G06F 21/53 713/193 |
| 2009/0070361 | A1 | 3/2009 | Haber et al. |
| 2013/0083926 | A1 | 4/2013 | Hughes et al. |
| 2014/0181058 | A1* | 6/2014 | Kundu ............. G06F 21/64 707/698 |
| 2015/0295720 | A1 | 10/2015 | Buldas et al. |
| 2016/0253523 | A1 | 9/2016 | Kroonmaa et al. |
| 2017/0289151 | A1 | 10/2017 | Shanahan et al. |
| 2017/0357496 | A1 | 12/2017 | Smith et al. |

OTHER PUBLICATIONS

Becker, "Merkle Signature Schemes, Merkle Trees and Their Cryptanalysis," Technical Report [Seminararbeit], Ruhr-University Bochum, Jul. 18, 2008, 28 pages.

Buchmann et al., "On the Security of the Winternitz One-Time Signature Scheme: Full Version," International Conference on Cryptology in Africa, Jul. 5, 2011, 17 pages.

Campagna et al., "Quantum Safe Cryptography V1.0.0 (Oct. 2014): Quantum Safe Cryptography and Security; An Introduction, benefits, enablers and challenges," European Telecommunications Standards Institute White Paper, ISBN 979-10-92620-03-0, Oct. 1, 2014, 49 pages.

Cooper et al., "Internet X.509 Public Key Infrastructure Certificate and Certificate Revocation List (CRL) Profile," Request for Comments: 5280, Standards Track, 141 pages.

Dang, "Recommendation for Applications Using Approved Hash Algorithms," National Institute of Standards and Technology (NIST) Special Publication 800-107 Revision 1, Aug. 2010, retrieved Nov. 24, 2015, http://csrc.nist.gov/publications/nistpubs/800-107-rev1/sp800-107-rev1.pdf, 25 pages.

Elwailly et al., "QuasiModo: Efficient Certificate Validation and Revocation," International Workshop on Public Key Cryptography, Feb. 26, 2004, 14 pages.

International Search Report and Written Opinion dated Mar. 26, 2018, International Patent Application No. PCT/US2017/067978, filed Dec. 21, 2017, 14 pages.

International Search Report and Written Opinion dated Mar. 26, 2018, International Patent Application No. PCT/US2017/067994, filed Dec. 21, 2017, 13 pages.

McGrew et al., "Hash-Based Signatures: draft-mcgrew-hash-sigs-02," Crypto Forum Research Group Internet-Draft, Jul. 4, 2014, 52 pages.

McGrew et al., "Hash-Based Signatures: draft-mcgrew-hash-sigs-06," Crypto Forum Research Group Internet-Draft, Mar. 5, 2017, 25 pages.

Menezes et al., Handbook of Applied Cryptography, CRC Press, 1997, ISBN 0-8493-8523-7, 794 pages.

Micali, "Efficient Certificate Revocation," Technical Report TM-542b, MIT Laboratory for Computer Science, Mar. 22, 1996, 10 pages.

Santesson et al., "X.509 Internet Public Key Infrastructure Online Certificate Status Protocol—OCSP," Request for Comments 6960, Standards Track, Jun. 2013, 41 pages.

Wikipedia, "Lamport Signature," page last modified Oct. 13, 2016, retrieved Dec. 16, 2016, https://en.wikipedia.org/wiki/Lamport_signature, 5 pages.

Wikipedia, "Merkle Signature Scheme," page last modified Sep. 23, 2016, retrieved Dec. 16, 2016, https://en.wikipedia.org/wiki/Merkle_signature_scheme, 3 pages.

Wikipedia, "Merkle Tree," retrieved Jul. 12, 2012, from https://en.wikipedia.org/w/index.php?title=Merkle_tree&oldid=499247620, 4 pages.

\* cited by examiner

HOST ATTESTATION

CROSS-REFERENCE TO RELATED APPLICATIONS

This application is a divisional of U.S. patent application Ser. No. 15/389,771, filed on Dec. 23, 2016, now U.S. Pat. No. 10,229,270, entitled "HOST ATTESTATION," which is incorporated herein by reference for all purposes.

This application incorporates by reference for all purposes the full disclosures of U.S. patent application Ser. No. 15/390,176, filed Dec. 23, 2016, now U.S. Pat. No. 10,218,511, entitled "SIGNATURE DELEGATION," co-pending U.S. patent application Ser. No. 15/389,686, filed Dec. 23, 2016, now U.S. Pat. No. 10,230,525, entitled "PUBLIC KEY ROLLUP FOR MERKLE TREE SIGNATURE SCHEME," co-pending U.S. patent application Ser. No. 15/390,205, filed Dec. 23, 2016, now U.S. Pat. No. 10,237,249, entitled "KEY REVOCATION," and of co-pending U.S. patent application Ser. No. 15/390,214, filed Dec. 23, 2016, now U.S. Pat. No. 10,243,939, entitled "KEY DISTRIBUTION IN A DISTRIBUTED COMPUTING ENVIRONMENT."

BACKGROUND

For many businesses, third-party computing resource service providers are an important part of their computing infrastructure. Many businesses deploy application programs to virtual computing environments provided by third-party computing resource service providers. As the resource demands of a particular application change over time, business administrators are able to scale each virtual computing environment up or down as needed. However, when using virtual computing environments in this way, it is important for the user of the virtual computing environment to be able to confirm that the computing environment complies with an appropriate configuration. For example, before deploying an application or interacting with a service hosted on a virtual computer system, a customer may desire proof that the virtual computer instance is configured with an authentic image, that the host of the virtual computer instance is properly configured, and that the host of the virtual computer instance is owned by the computing resource service provider.

BRIEF DESCRIPTION OF THE DRAWINGS

Various techniques will be described with reference to the drawings, in which.

DETAILED DESCRIPTION

Figure 1:
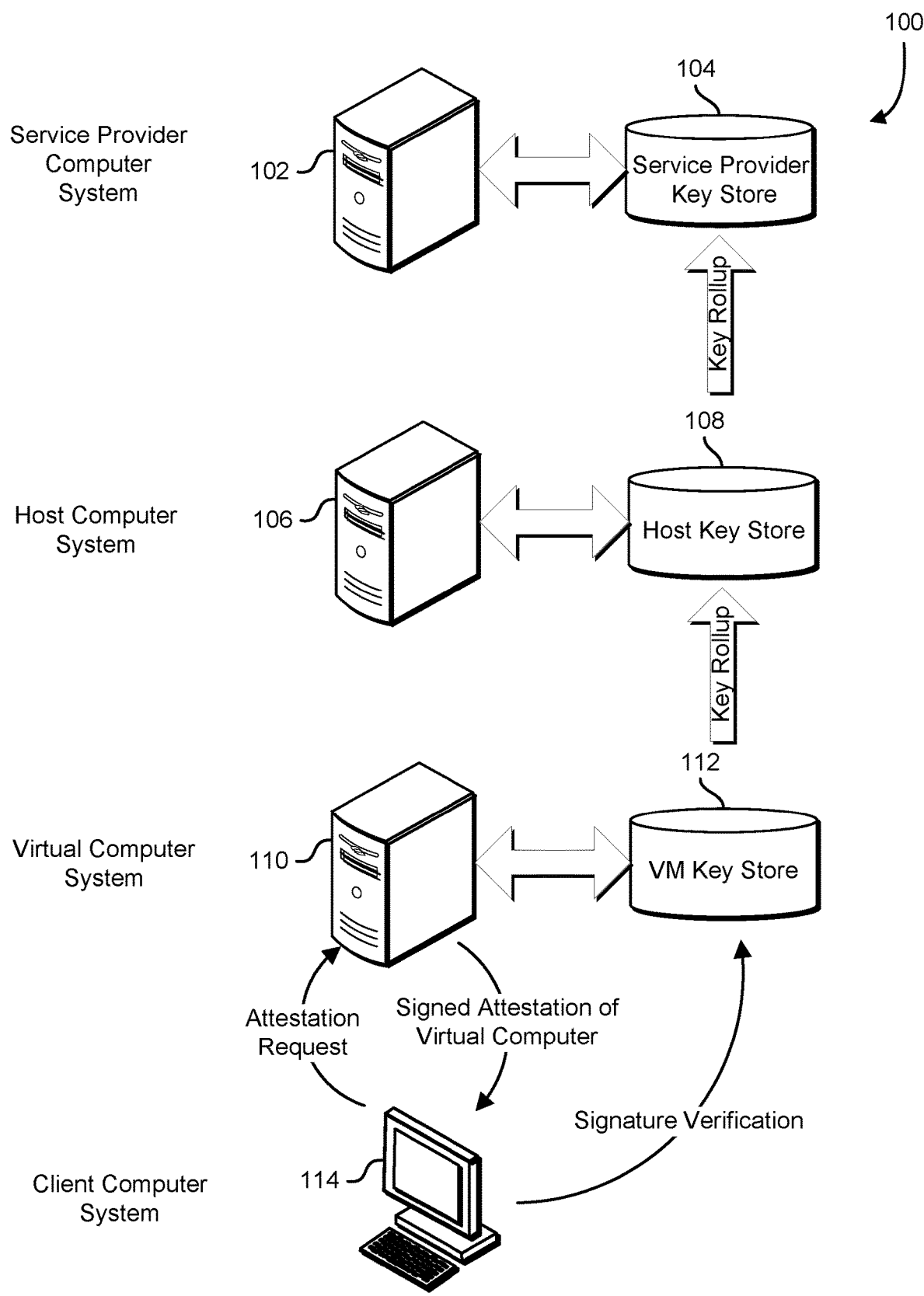
FIG. 1 shows an illustrative example of an environment in which various embodiments may be practiced.

The current document describes a system that produces signed attestations as evidence of the integrity of a virtual computing environment. In various examples, a service provider provides virtual computing services to a customer in the form of one or more virtual computing environments hosted by one or more hosts operated by the service provider. The virtual computing environment may be a virtual machine, container runtime, on-demand execution engine, or other application-execution environment. The service provider may host the virtual computing environments on one or more server computer systems, server clusters, virtual computer systems, or other host computer systems. In order to confirm the trustworthiness and integrity of the virtual computing environments provided, the customer may impose various constraints on the host computer systems used as well as the images installed on the virtual computing environments. In order to confirm that the constraints are complied with, the customer may request an attestation from the service provider, the host computer system, and the virtual computing environment.

The attestation may be generated and signed by a combination of the service provider, the host computer system, and a virtual computing environment. In some examples, the service provider confirms the identity and configuration of the host computer systems, the host computer system confirms the integrity of the host operating environment and the virtual runtime, and the virtual computing environment verifies the configuration of the customer's image. The resulting attestation may be signed using a digital signature that is verifiable using public keys of one or more of the three attesting entities.

In some examples, the service provider uses remote attestation to verify the integrity of host computer systems using a trusted platform module ("TPM"). A signature authority computer system operated by the service provider contacts each host computer system operated by the service provider and requests a signature of various hardware and software installed on the host computer system. A TPM on each host computer system examines the host and generates the requested signature that represents the hardware and software configuration. The TPM signs the signature with a secret portion of an attestation identity key owned by the TPM. In various examples, the attestation identity key is a digital certificate issued by a trusted certificate authority ("CA"), an RSA public-private key pair, or a Merkle signature tree under the control of the TPM. The signature authority computer system receives the signatures from the host computer systems and compares the signatures to reference signatures in a database maintained by the service provider. The host computer systems whose signatures match a valid reference signature in the database are determined by the service provider to be properly configured.

A Merkle tree of one-time-use cryptographic keys is generated for each of the properly configured host computer systems. In some examples, the Merkle trees are generated by the service provider and provided to each host computer system. In another example, the Merkle trees are generated by a TPM on each host and are stored within the TPM on each host. The root node of each Merkle tree acts as a public key for a corresponding individual host computer system. The public keys corresponding to the host computer systems are provided to the signature authority computer system, and the signature authority computer system generates, for the service provider, a Merkle tree of the public keys. The root of the service provider's Merkle tree acts as a public key for the service provider and is published by the signature authority computer system.

As described above, each properly configured host computer system is provided with a Merkle tree of one-time-use cryptographic keys by the service provider. In some examples, the virtual client manager on the host computer system uses the provided one-time-use cryptographic keys to perform additional attestations. In some examples, the attestations may be used to confirm the integrity of the host operating system and/or the virtual runtime. The virtual client manager uses the TPM on the host computer system to generate a host-describing signature describing the configuration of the host operating environment and virtual runtime. The TPM signs the host-describing signature with the attestation identity key, and provides the signed signature to a virtual client manager running on the host computer system. The virtual client manager confirms the signature of the TPM using a public portion of the attestation identity key, and compares the host-describing signature to a set of approved signatures maintained in a host signature database. In other examples, the virtual client manager provides signed code to the TPM, and the TPM executes the signed code to confirm that the host computer system is configured in accordance with customer requirements.

When a virtual client manager on a properly configured host computer system generates a new virtual computing environment, the virtual client manager provides the new virtual computing environment with a set of one-time-use cryptographic keys arranged in a Merkle tree, and the virtual client manager signs the root of the Merkle tree with one of the one-time-use keys provided to the virtual client manager by the service provider. In some implementations, the virtual client manager provides a virtual client manager on the virtual computing environment with the corresponding Merkle tree. In other implementations, the virtual client manager causes the TPM to generate and retain the Merkle trees, and the virtual client manager grants each virtual computing environment access to a Merkle tree by providing each virtual computing environment with access credentials to the TPM. In some examples, before signing the root of the Merkle tree, the virtual client manager confirms the integrity of the virtual computing environment. For example, the virtual client manager may use the TPM to generate a signature of the image of the virtual computing environment or portion of the virtual computing environment, and compare the signature against a database of approved image signatures. The signed root of the Merkle tree provided to the virtual computing environment becomes the public key of the virtual computing environment.

Using the provided signed Merkle tree of one-time-use cryptographic keys, a virtual client manager in the virtual computing environment is able to produce signed attestations for customer applications, end users, and other entities regarding the integrity of the virtual computing environment. In one example, a customer service is deployed to a virtual computing environment, and the customer service requests, from the virtual client manager running within the virtual computing environment, an attestation that the virtual computing environment is a properly configured environment hosted by the service provider. The virtual client manager verifies various environment properties as requested by the customer service (possibly using the TPM) and, using the credentials provided by the host computer system, accesses the Merkle tree of one-time-use keys provided by the host computer system when the virtual computing environment was created. An unused one-time-use key is selected from the Merkle tree and used to sign the attestation. The signed attestation is provided to the customer service.

The customer, end user, or client application may use the signed attestation to verify the state of the service provider, the host computer system, and the virtual computing environment. The signature on the attestation is confirmed by verifying the signature using the public keys associated with the virtual computing environment. The root of the Merkle tree of the virtual computing environment is signed by the host computer system. The signature of the root of the Merkle tree of the virtual computing environment is verified against a public key of the host computer system. The public key of the host computer system is a leaf node of the Merkle tree of the service provider and is verified against the public key of the service provider.

FIG. 1 shows an illustrative example of an environment in which various embodiments may be practiced. A diagram 100 shows a system where signed attestations establish the integrity of a virtual computing environment. A service provider provides computing services to customers via a fleet of computer systems, storage systems, and other computing infrastructure. A service provider computer system 102 maintains a service provider key store 104. The service provider key store retains cryptographic information including cryptographic keys, hashes, and digital certificates controlled by the service provider.

The service provider maintains a fleet of host computer systems that includes a host computer system 106. The host computer system 106 is used to provide virtual computing environments to customers of the service provider. In some examples, the host computer system 106 is used to provide virtual machines to customers. In another example, the host computer system is used to provide an on-demand function execution service. In yet another example, the host computer system is used to host a container runtime that hosts containerized applications provided by customers. The host computer system 106 maintains a host key store 108 that retains cryptographic keys, hashes, digital certificates, or other cryptographic information associated with the host computer system 106. In some implementations, the host computer system 106 includes a trusted platform module ("TPM") and the host key store 108 resides within the TPM.

In another implementation, the host computer system 106 retains the host key store 108 and a memory outside the TPM, and the TPM applies a signature to the host key store 108.

The host computer system 106 hosts one or more virtual computing environments including the virtual computer system 110. The virtual computer system 110 is a virtual machine generated by the host computer system 106 and may be loaded with a customer image by the host computer system 106. The virtual computer system 110 accesses a VM key store 112. The VM key store may be retained in memory associated with the virtual computer system 110 or within a TPM on the host computer system 106. The virtual computer system 110 includes an attestation service that may be accessed by applications, end users, or other entities. The attestation service provides signed attestations that the virtual computer system 110, the host computer system 106, and the service provider computer system 102 are properly configured in accordance with customer requirements.

A verifiable key structure linking the service provider key store 104, the host key store 108, and the VM key store 112 is generated as a result of the deployment and configuration of the host computer system 106 and the virtual computer system 110. The service provider deploys and allocates a number of host computer systems. The host computer systems are installed with host images and configured to act as host for virtual computing environments. Each host computer system includes a TPM. The service provider uses the TPM to confirm the proper configuration of each host computer system. In some implementations, the TPM generates a checksum of software and hardware configuration, and the checksum is confirmed against a database of approved checksums maintained by the service provider. In some implementations, the TPM ensures that only applications signed by an approved authority are executed on the host computer system 106. Each host computer system generates a Merkle tree of one-time-use cryptographic keys to be used by the host computer system. The root of the Merkle tree is published to the service provider. If the service provider determines that the host computer system 106 is properly configured, the root value of the Merkle tree associated with the host computer system 106 is gathered with other root values of Merkle trees associated with other computer systems to form a service provider Merkle tree. The service provider Merkle tree rolls up to a service provider hash. The service provider hash is published as a public key for the service provider.

When the host computer system 106 generates a new virtual computer system, the host computer system 106 causes a Merkle tree of one-time-use cryptographic keys to be generated for the virtual computer system. The root of the Merkle tree is signed using one of the one-time-use cryptographic keys generated above. In some implementations, the host computer system 106 performs various checks on the virtual computer system before signing the root of the Merkle tree of the virtual computer system 110. In some examples, the Merkle tree of one-time-use cryptographic keys is maintained by the virtual computer system 110 in the VM key store 112. In other implementations, the Merkle tree of one-time-use cryptographic keys is maintained in a TPM on the host computer system 106, and the virtual computer system 110 is granted access to the TPM to access the set of one-time-use cryptographic keys.

A client computer system 114 requests an attestation from the virtual computer system 110. The virtual computer system 110 performs the requested attestation, and signs the requested attestation with one of the one-time-use cryptographic keys provided to the virtual computer system 110. In some implementations, the virtual computer system 110 performs the requested attestation using a TPM on the host computer system 106, and the TPM signs the attestation with a one-time-use key assigned to the virtual computer system and retained by the TPM. The signed attestation is returned to the client computer system 114.

The signature on the attestation is verified by verifying that the signature on the attestation is properly generated with a one-time-use key from the Merkle tree associated with the virtual computer system 110. The root hash of the Merkle tree associated with the virtual computer system 110 is signed by the host computer system 106 using a one-time-use cryptographic key that links up to the root of a Merkle tree on the host key store 108. The root of the Merkle tree on the host key store 108 is a leaf node of the Merkle tree generated by the service provider and retained on the service provider key store 104. Therefore, the signature on the Merkle tree on the VM key store 112 can be verified up to the root node of the Merkle tree maintained on the service provider key store 104, which serves as the public key of the service provider. In various implementations, verification of the attestation may be used to indicate that the service provider computer system 102 has confirmed that the host computer system 106 is a properly configured host computer system operated by the service provider, that the host computer system 106 is hosting the virtual computer system 110, and that the virtual computer system 110 has confirmed a valid operating environment.

Figure 2:
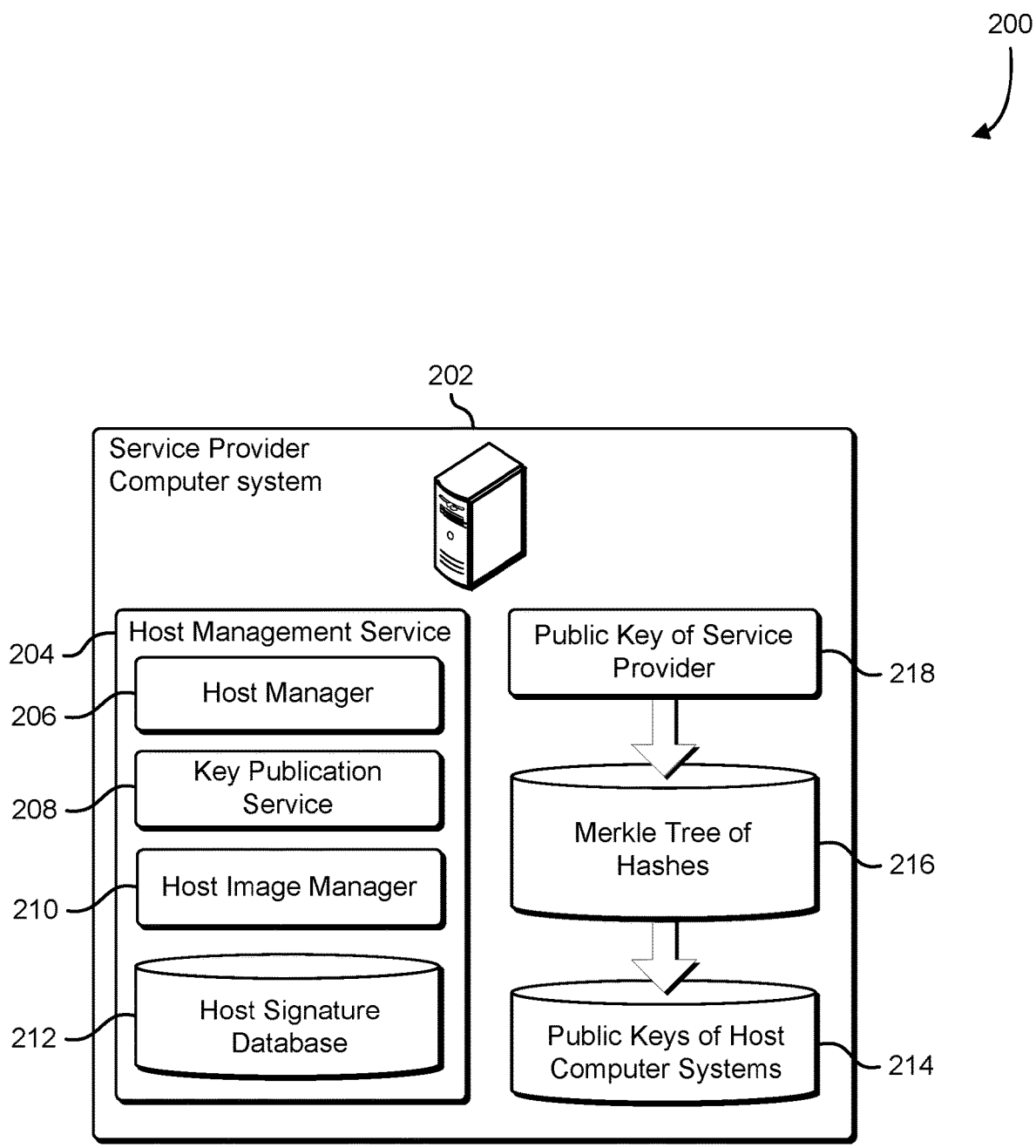
FIG. 2 shows an illustrative example of a computer system that manages host computer systems for a service provider.

FIG. 2 shows an illustrative example of a computer system that manages host computer systems for a service provider. A block diagram 200 illustrates a structure of a service provider computer system 202 that provides host-management services for a service provider using a host management service 204. The host management service 204 includes a host manager 206, the key publication service 208, and host image manager 210. The host manager 206 is a service that tracks and manages a collection of host computer systems owned and operated by the service provider. The host manager 206 includes a database of host computer systems, and communicates management instructions to an agent on each host to perform configuration and other management tasks. The key publication service 208 is a network-accessible service that provides cryptographic hashes used for verifying digital signatures generated using cryptographic keys that are based at least in part on a public key of the service provider. The host image manager 210 works with the host manager 206 to provide imaging services to the host computer systems under the control of the service provider. The host management service 204 includes a host signature database 212. The host signature database 212 contains a database of environment signatures for the host computer systems that are under management. The service provider computer system 202 maintains a database of public keys 214 that are been assigned to host computer systems, a Merkle tree 216 of hashes cryptographically derived from the database of public keys 214, and a public key 218 at the root of the Merkle tree that acts as the public key of the service provider. Cryptographically derived from a value means using a one-way function at least once using inputs that are the values or derived from the values (possibly cryptographically derived from the values).

The host manager 206 contacts the hosts that are managed by the service provider, and verifies the configuration of each host using a TPM on each host. The configuration of the hosts may be verified by comparing a configuration signature provided by a TPM on each host against information in the host signature database 212. If a particular host is not configured, or is improperly configured, the host image manager 210 may be used to apply a clean image to the particular host. The host manager 206 retrieves a public key from each host that is determined to be properly configured, and the public keys are stored in the database of public keys 214. The host manager 206 generates the Merkle tree 216 from the public keys, resulting in the public key 218 of the service provider. The key publication service 208 publishes the public key 218 of the service provider, the Merkle tree 216, and the database of public keys 214. The key publication service 208 enables recipients of digital signatures to verify digital signatures against the public key 218 of the service provider.

Figure 3:
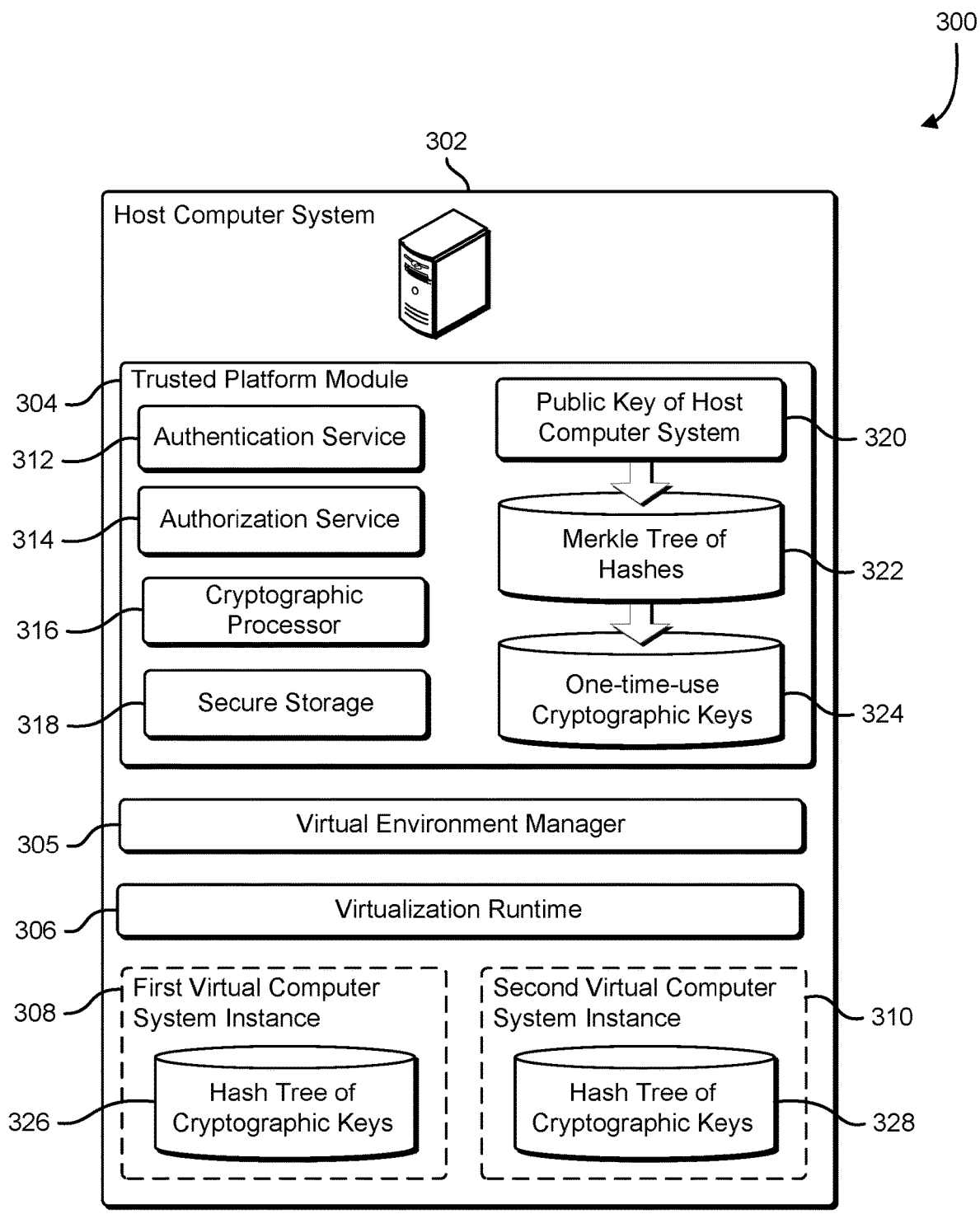
FIG. 3 shows an illustrative example of a host computer system with a trusted platform module ("TPM") that hosts one or more virtual computer system instances.

FIG. 3 shows an illustrative example of a host computer system with a trusted platform module ("TPM") that hosts one or more virtual computer system instances. A block diagram 300 shows a host computer system 302 that is operated by a service provider. The host computer system 302 may be a server computer, server cluster, computer appliance, or other computing device capable of hosting one or more virtual computing environments. The host computer system 302 includes a trusted platform module 304. In general, a trusted platform module is a hardware device comprising a secure cryptoprocessor and associated memory that provides support for encryption, decryption, a key generation, and other cryptographic operations in a protected tamper-resistant environment. The host computer system 302 also includes a virtual environment manager 305, and a virtualization runtime 306. The virtual environment manager 305 is a service running on the host computer system 302 that manages the creation, verification, and configuration of virtual computing environments on the host computer system 302. The virtual environment manager 305 interacts with a virtualization runtime 306. The virtualization runtime 306 is a runtime that supports virtual machines, container services, on-demand function execution, or other virtual computing environment. In the example shown in FIG. 3, the virtualization runtime 306 implements the first virtual computer system instance 308 and a second virtual computer system instance 310. The virtualization runtime 306 may support additional virtual computer systems, virtual machines, container runtimes, and other virtual computing environments.

The trusted platform module 304 includes an authentication service 312 and an authorization service 314. The authentication service 312 is a service within the trusted platform module that authenticates the identity of entities attempting to use the trusted platform module 304. The identity of entities attempting to use the trusted platform module 304 may be verified using digital certificates, passwords, or other credentials. The authorization service 314 determines whether a particular entity is authorized to perform a particular cryptographic operation. The authorization service 314 maintains a database of authorized entities and determines whether each request submitted to the trusted platform module 304 is allowable. The trusted platform module includes a cryptographic processor 316 and secure storage 318. In various implementations, the cryptographic processor may perform encryption, decryption, signing, key generation, random number generation, cryptographic hash determination, and other cryptographic operations. The secure storage 318 contains cryptographic keys, attestation keys, cryptographic hashes, Merkle trees, and other cryptographic information used by the trusted platform module 304.

The trusted platform module 304 contains a Merkle tree of one-time-use cryptographic keys that are linked into a corresponding Merkle tree maintained by the service provider. The Merkle tree within the trusted platform module 304 has a root node 320 that acts as a public key of the host computer system 302. The root node 320 is linked to a Merkle tree of hashes 322 that leads to a set of one-time-use cryptographic keys 324. The set of one-time-use cryptographic keys 324 is used by the virtual environment manager 305 to sign root nodes of hash trees that are associated with individual virtual computing environments. The first virtual computer system instance 308 includes a first hash tree of one-time-use cryptographic keys 326 and the second virtual computer system instance 310 includes a second hash tree of one-time-use cryptographic keys 328. The first hash tree of cryptographic keys 326 has a first root node that is signed using one of the one-time-use cryptographic keys 324 of the host computer system 302. The second hash tree of graphic keys 328 has a second root node that is signed using a different one-time-use cryptographic key of the one-time-use cryptographic keys 324.

Each time the virtual environment manager 305 generates a new virtual computing environment, the virtual environment manager 305 causes the new virtual computing environment to generate an associated hash tree of one-time-use cryptographic keys. The virtual environment manager 305 may use the trusted platform module 304 to verify the integrity of the new virtual computing environment. If the virtual environment manager 305 determines that the integrity of the new virtual computing environment is valid, the virtual environment manager 305 retrieves the root hash of the hash tree of one-time-use cryptographic keys of the new virtual computing environment, and signs the root hash with one of the host computer system's one-time-use cryptographic keys 324. The signed root hash is returned to the new virtual computing environment and may serve as proof that the new virtual computer system is running on a properly configured host computer system operated by the service provider.

Figure 4:
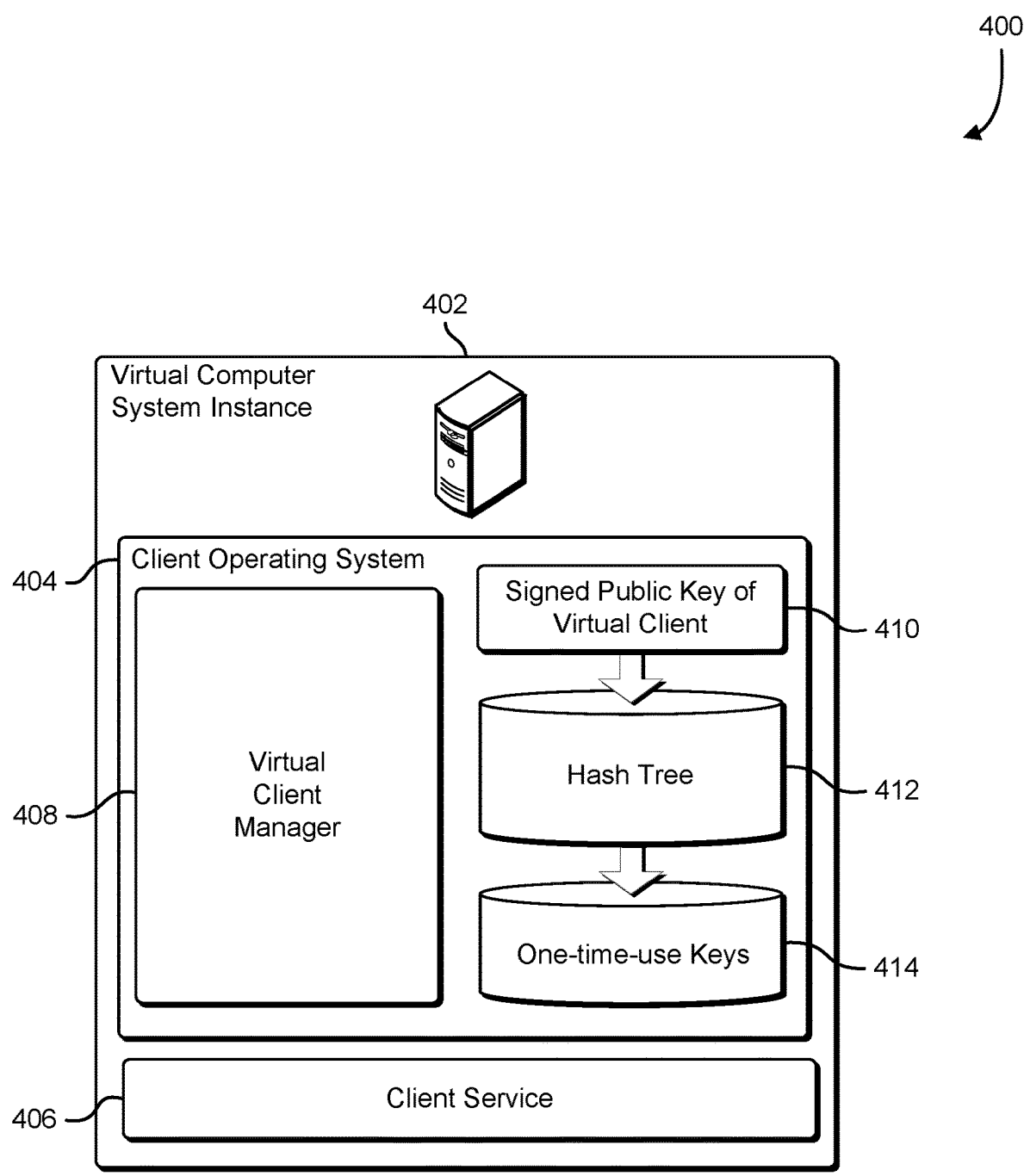
FIG. 4 shows an illustrative example of a virtual computer system instance that is able to provide signed attestations of the computing environment.

FIG. 4 shows an illustrative example of a virtual computer system instance that is able to provide signed attestations of the computing environment. A block diagram 400 shows a virtual computer system instance 402 that is hosted by a host computer system operated by a service provider. The virtual computer system instance 402 includes a client operating system 404 that supports a client service 406. In other examples, the client operating system 404 supports a user program, a network service, or other client application deployed by a customer. The client operating system 404 includes a virtual client manager 408. The virtual client manager 408 receives an attestation request from the client service 406.

In response to the attestation request, the virtual client manager 408 performs operations to confirm the integrity of the virtual computer system instance. In some implementations, the virtual client manager uses the TPM installed on the host computer system that hosts the virtual computer system instance 402 to verify the configuration of the virtual computer system instance 402. If the virtual client manager 408 determines that the virtual computer system instance 402 is properly configured, the virtual client manager 408 signs an attestation to that effect using a digital signature generated with a one-time-use key selected from a set of one-time-use keys 414 issued to the virtual computer system instance 402 by the host of the virtual computer system instance 402. The set of one-time-use keys 414 is linked via a hash tree 412 to a root node of the hash tree 410. The root node of the hash tree 410 is signed using a one-time-use key owned by the host computer system of the virtual computer system instance 402. The signed attestation is returned to the client service 406.

The client service 406 retrieves the public key of the virtual computer system instance 402 from the client operating system 404 and verifies that the signature of the attestation is valid for the root node of the hash tree 410. To confirm the root node of the hash tree 410, the client service 406 retrieves verification hashes from a publication service operated by the service provider, and retrieves verification hashes from the host computer system. In some examples, verification hashes associated with the host computer system are retrieved from the TPM on the host computer system. The client service 406 verifies that the signature on the root node of the hash tree 410 can be verified using hash trees of the host computer system and the service provider to a root public key of the service provider. In this way, the client service 406 may verify that the integrity of the virtual computer system instance 402 has been verified by the virtual client manager 408, the host computer system of the virtual computer system instance 402, and the service provider.

Figure 5:
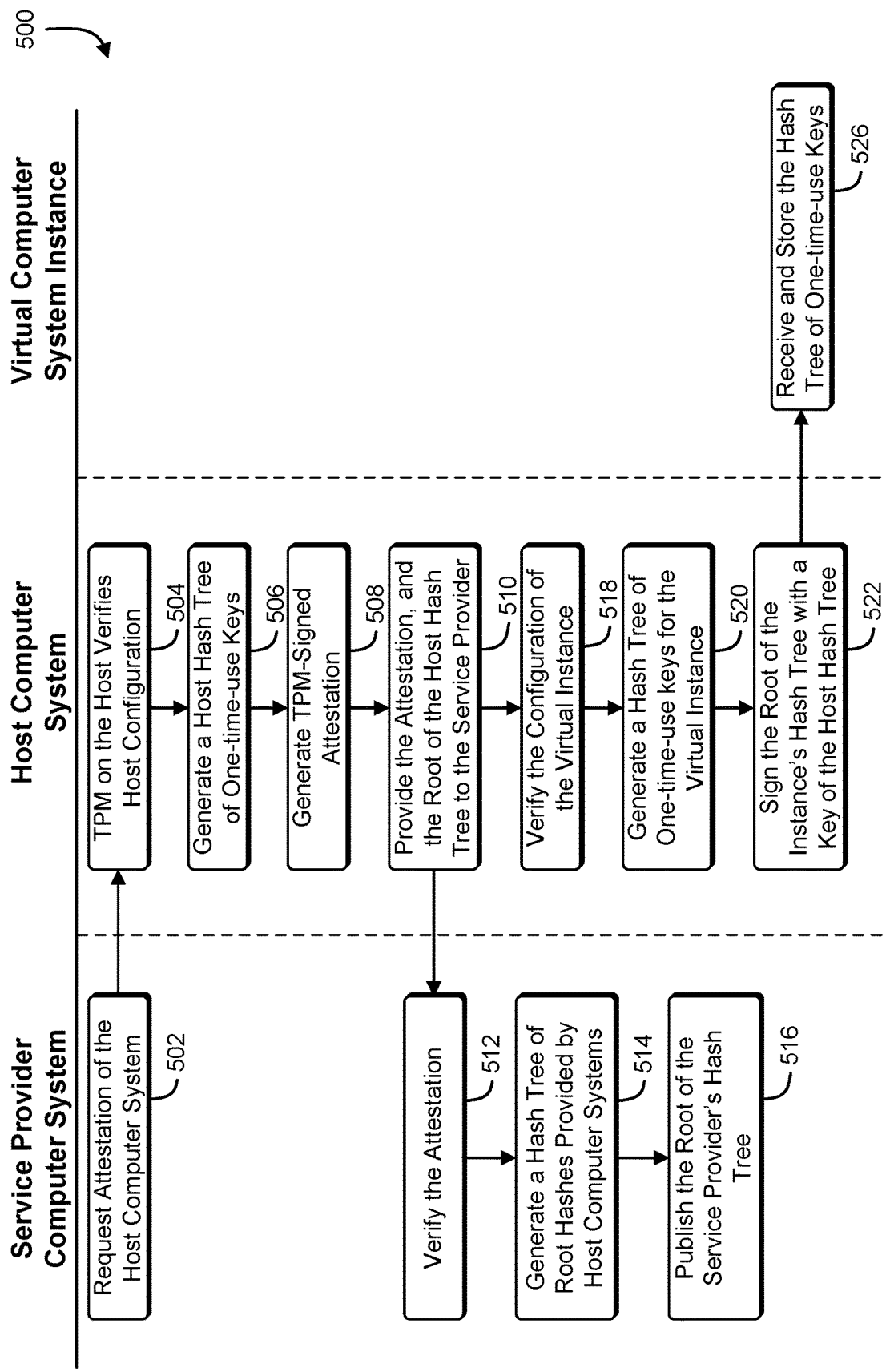
FIG. 5 shows an illustrative example of a process that, as a result of being performed by a service provider, a host computer system, and a virtual computer system instance, generates and distributes a set of one-time-use cryptographic keys that are used by the virtual client computer system.

FIG. 5 shows an illustrative example of a process that, as a result of being performed by a service provider, a host computer system, and a virtual computer system instance, generates and distributes a set of one-time-use cryptographic keys that are used by the virtual client computer system. A swim diagram 500 illustrates a process that begins at block 502 with a service provider computer system requesting an attestation from the host computer system. The service provider computer system may act as a signature authority for the service provider. In various examples, the attestation may be a request for a signature that represents the hardware and software configuration of the host computer system. In other examples, the attestation may be a request for configuration information relating to the host computer system. In yet another example, the attestation request may include instructions to be executed on a trusted platform module on the host computer system.

The host computer system receives the request from the service provider computer system, and the host computer system uses a trusted platform module on the host computer system to verify 504 the host configuration. In some examples, the TPM generates a signature representing the hardware and software configuration of the host computer system, and the TPM compares the signature against one or more approved signatures that correspond to verifiable hardware and software configurations. In some implementations, the authorized signatures are provided by the service provider computer system with the request. In other implementations, the authorized signatures are retained on the TPM on the host computer system.

If the host computer system is able to verify the hardware and software configuration of the host computer system, the host computer system generates 506 a set of one-time-use cryptographic keys for use by the host computer system. In some examples, the set of one-time-use cryptographic keys is comprised of Lamport or Winternitz keys. The host computer system generates a hash tree (also known as a Merkle tree) using hashes generated from the set of one-time-use cryptographic keys as leaf nodes, and linking to a root node hash that serves as a public key for the host computer system. At block 508, the host computer system uses the TPM to generate a signed attestation. In some examples, the signed attestation is a signature describing the hardware and software configuration of the host computer system that is signed using a private cryptographic key belonging to the TPM. At block 510, the host computer system provides the signed attestation and the root node hash to the service provider computer system.

The service provider computer system receives the signed attestation from the host computer system and verifies 512 both the signature on the attestation and the value of the attestation itself. In some examples, the service provider computer system uses a public key of the TPM to verify the signature on the attestation. The attestation itself is verified against a set of approved signatures maintained by the service provider computer system. The service provider computer system attempts to collect verifiable attestations from each of the host computer systems managed by the service provider. At block 514, the service provider computer system collects the root node hashes of the host computer systems that have also provided verified attestations to the service provider computer system. The root node hashes of the host computer systems are used by the service provider computer system to generate 514 a service-provider hash tree of the root node hashes. The service-provider hash tree has a root hash that is used as a public key for the service provider. At block 516, the service provider computer system publishes the root hash of the service-provider hash tree along with other hashes of the service-provider hash tree. Publication of the service-provider hash tree enables recipients of digital signatures generated with one-time-use keys controlled by host computer systems to verify the digital signatures against the public key of the service provider.

The host computer system uses the one-time-use keys generated at block 506 to provide additional one-time-use keys to virtual computer system instances managed by the host computer system. At block 518, the host computer system creates the virtual computer system instance and verifies the configuration of the virtual computer system instance. The host computer system verifies the integrity of the virtual computer system instance. In some examples, the host computer system uses the TPM to verify parts of the virtual runtime on the host computer system. In other examples, the host computer system uses the TPM to verify the image running on the virtual computer system instance. If the integrity of the virtual computer system instance cannot be verified, the virtual computer system instance is not provided with cryptographic keys that are signed by the host computer system. At block 520, if the integrity of the virtual computer system instance is verified, the host computer system generates a set of one-time-use cryptographic keys for use by the virtual computer system instance. Hashes of the set of one-time-use cryptographic keys are used to generate a hash tree that links the set of one-time-use cryptographic keys to a root hash which serves as a public key for the virtual computer system instance. At block 522, the host computer system signs the public key of the virtual computer system instance (root hash) using one of the one-time-use cryptographic keys generated by the host computer system at block 506.

The number of one-time-use cryptographic keys generated for use by the virtual computer system instance can be determined by the host computer system based on the projected needs of the individual virtual computer system instance. If additional keys are needed by the virtual computer system instance, the host computer system may generate an additional set of one-time-use cryptographic keys for the virtual computer system instance, generate an additional hash tree of the additional set of one-time-use cryptographic keys, and sign the new root of the additional hash tree.

The one-time-use cryptographic keys generated by the host computer system at block 520 are made available to the virtual computer system instance. In some examples, the one-time-use cryptographic keys and the associated hash tree are provided to the virtual computer system instance, and the virtual computer system instance receives and stores 526 the one-time-use cryptographic keys and the associated hash tree within the virtual computer system instance. In other examples, the one-time-use cryptographic keys are retained in a TPM on the host computer system, and TPM credentials are provided to the virtual computer system instance that allows the virtual computer system instance to access the one-time-use cryptographic keys on the TPM.

Figure 6:
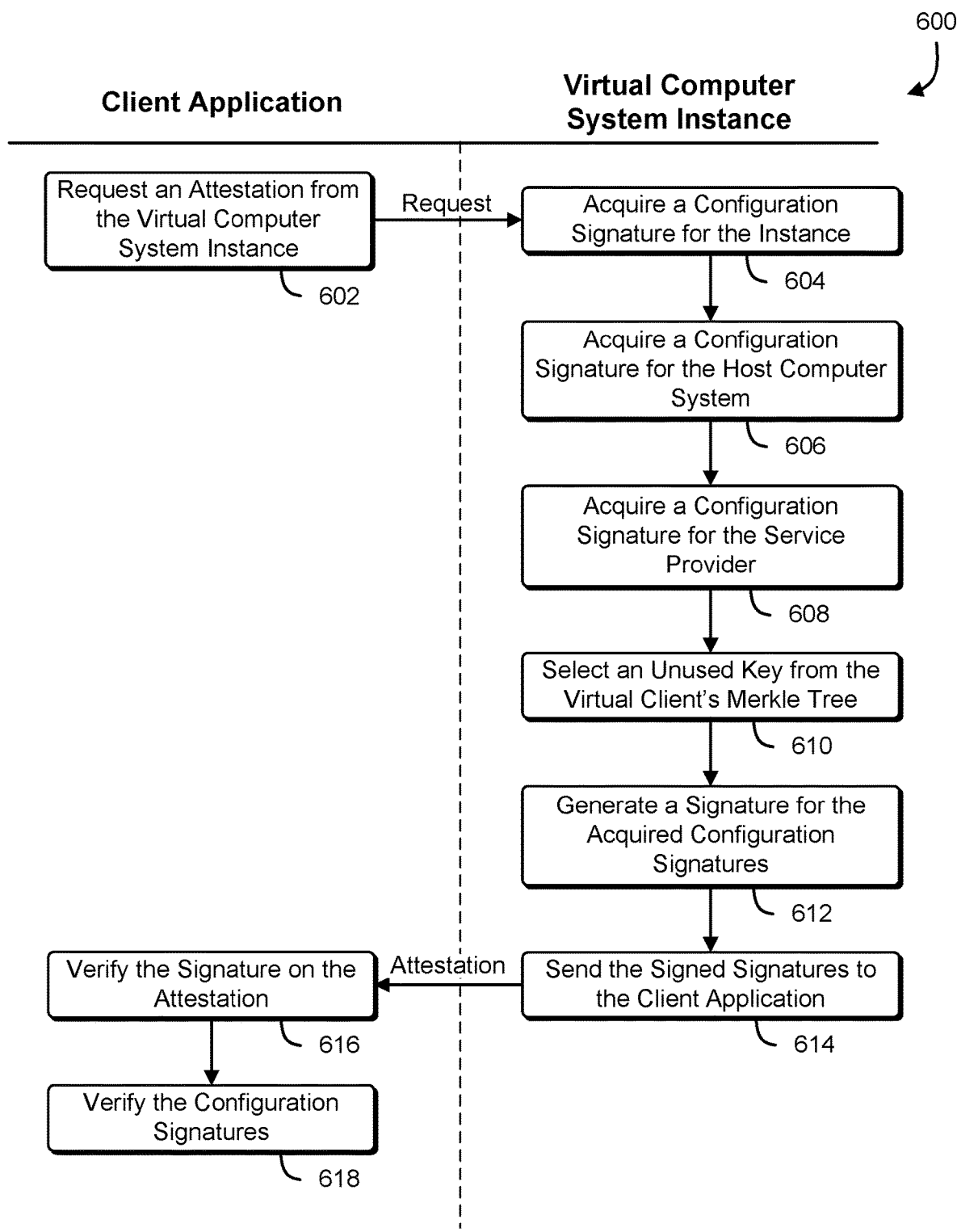
FIG. 6 shows an illustrative example of a process that, as a result of being performed by a client application and a virtual computer system instance, generates a signed attestation in response to a request from the client application.

FIG. 6 shows an illustrative example of a process that, as a result of being performed by a client application and a virtual computer system instance, generates a signed attestation in response to a request from the client application. A swim diagram 600 illustrates a process that begins at block 602 with a client application requesting an attestation from the virtual computer system instance. The request may include a request for a signature representing the configuration of the virtual computer system instance, or the request may include a set of constraints to be evaluated and certified by the virtual computer system instance.

At block 604, the virtual computer system instance receives the request and acquires a configuration signature for the virtual computer system instance. In various examples, the configuration signature is a hash, checksum, or cyclic redundancy code ("CRC") generated using measures of hardware and software configuration of the virtual computer system instance. In some examples, the virtual computer system instance generates the configuration signature based on the image running on the virtual computer system instance. In another example, the virtual computer system generates the signature based on cryptographic hashes of one or more software components running within the virtual computer system instance.

At block 606, the virtual computer system instance acquires a configuration signature for the host computer system hosting the virtual computer system instance. In some examples, the configuration signature of the host computer system is acquired by querying a service on the host computer system. In other examples, the configuration signature of the host computer system is acquired by generating a new host signature using a TPM on the host computer system. In yet another example, the virtual computer system instance queries the host computer system for the configuration signature, and the host computer system generates a new host signature if the configuration of the host computer system has changed. At block 608, the virtual computer system acquires a configuration signature for the service provider that operates the host computer system. In some examples, the configuration signature of the service provider is acquired by querying a service on a computer system operated by the service provider.

At block 610, the virtual computer system instance selects an unused key from the set of one-time-use cryptographic keys provided to the virtual computer system instance by the host computer system. The virtual computer system instance marks the selected key as used and generates 612 a digital signature for the configuration signatures using the selected one-time-use cryptographic key. At block 614, the virtual computer system instance sends the signed configuration signatures to the client application to be used as an attestation of system integrity.

The client application receives the signed attestation from the virtual computer system instance. At block 616, the client application verifies the signature on the attestation. In some examples, the signature on the attestation is verified by confirming the signature against the public key of the virtual computer system instance, and then verifying the signature on the public key of the virtual computer system instance against the public key of the service provider. At block 618, the client application examines the configuration signatures in the attestation and determines whether the configurations of the virtual computer system instance, the host computer system, and the service provider are acceptable. In some implementations, the client application retains a list of acceptable configuration signatures for the virtual computer system instance, the host computer system, and the service provider and compares the received configuration signatures against the list of acceptable configuration signatures. If the received configuration signatures are represented in the list of acceptable configuration signatures, the virtual computing environment of the virtual computer system instance is determined to be acceptable to the client application.

Figure 7:
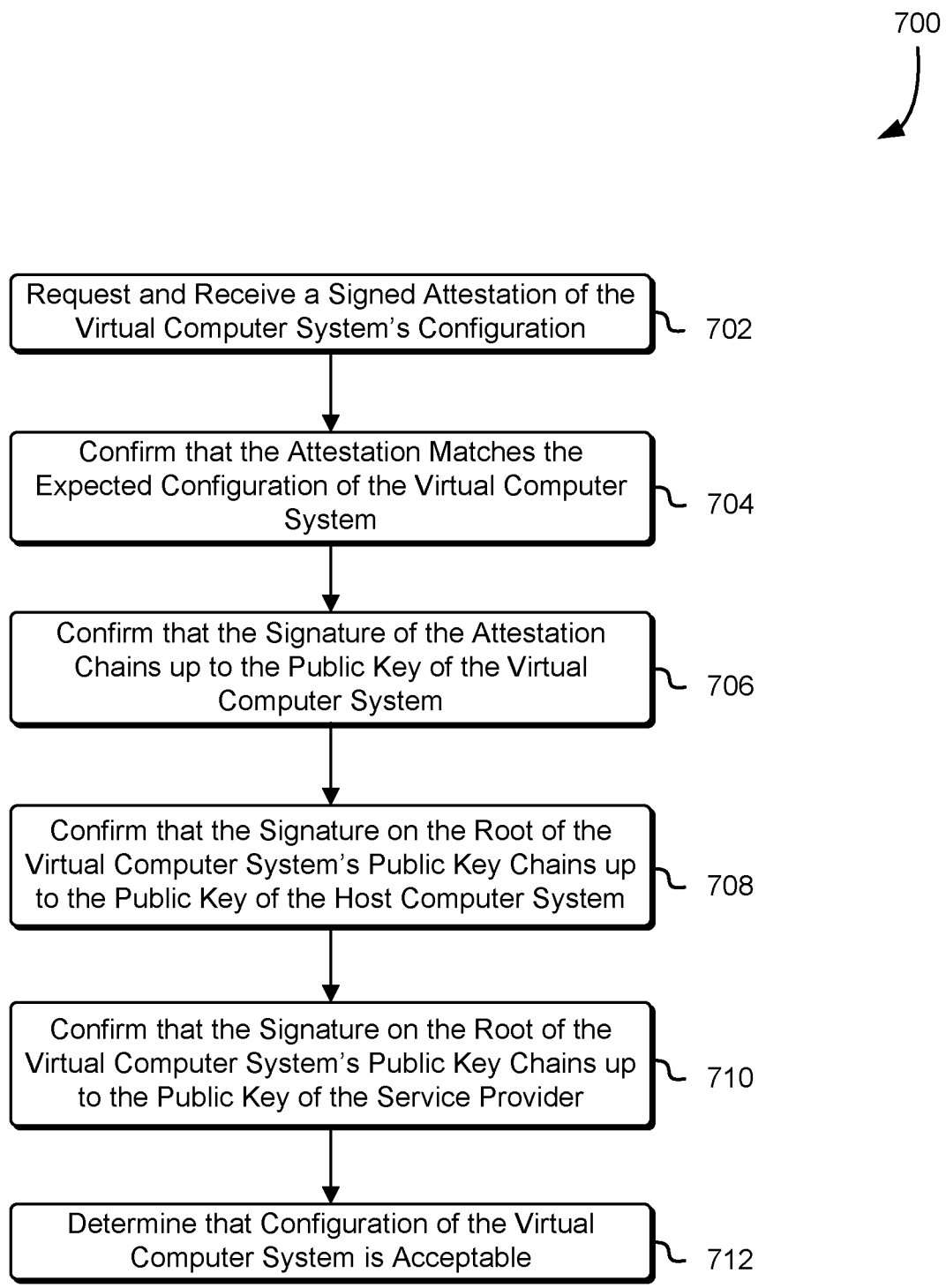
FIG. 7 shows an illustrative example of a process that, as a result of being performed by a client application, verifies a signed attestation provided by a virtual client computer system.

FIG. 7 shows an illustrative example of a process that, as a result of being performed by a recipient application, verifies a signed attestation provided by a virtual client computer system. A flowchart 700 illustrates a process that begins at block 702 with a recipient application receiving a signed attestation from a service on a virtual computer system. At block 704, the recipient application uses information within the attestation to confirm that the configuration of the virtual computer system matches a configuration that is acceptable to the recipient application. In some implementations, the recipient application compares the configuration signature of the attestation to a database of acceptable configuration signatures maintained by the application. If the configuration information in the attestation is acceptable to the recipient application, execution advances to block 706 and the recipient application verifies that the signature on the attestation is verifiable against a public key provided by the virtual computer system. In some implementations, the signature on the attestation is generated with a one-time-use cryptographic key, and the public key of the virtual computer system is a root of a hash tree built from hashes that includes a hash of the one-time-use cryptographic key.

The recipient application confirms that the public key provided by the virtual computer system is properly signed by the host computer system and the service provider. At block 708, the recipient application confirms that the signature on the public key of the virtual computer system is properly signed by the host computer system. The signature on the public key of the virtual computer system is signed using a one-time-use cryptographic key. The signature on the public key of the virtual computer system is verified using a hash tree and public key (root node of the hash tree) generated by and associated with the host computer system of the virtual computer system. The hash tree and public key of the host computer system are published by the host computer system. At block 710, the recipient application confirms that the public key of the host computer system is verifiable against the public key of the service provider. The service provider publishes a hash tree having a root node that represents the public key of the service provider. The public key of the host computer systems that are associated with the service provider are represented by the leaf nodes of the hash tree published by the service provider. The recipient application verifies that the public key of the host computer system is in the hash tree published by the service provider, and that the hash tree of the service provider properly chains up to the public key of the service provider.

After verifying the contents of the attestation and the signature on the attestation, at block 712, the recipient application determines that the configuration of the virtual computer system is acceptable. In some examples, the recipient application provides a challenge to the virtual computer system, and the virtual computer system signs the challenge with a digital signature. By verifying the digital signature against the public key of the host computer system and the service provider, the recipient application verifies that the service provider and the host computer system have attested to the proper configuration of the virtual computing environment.

Figure 8:
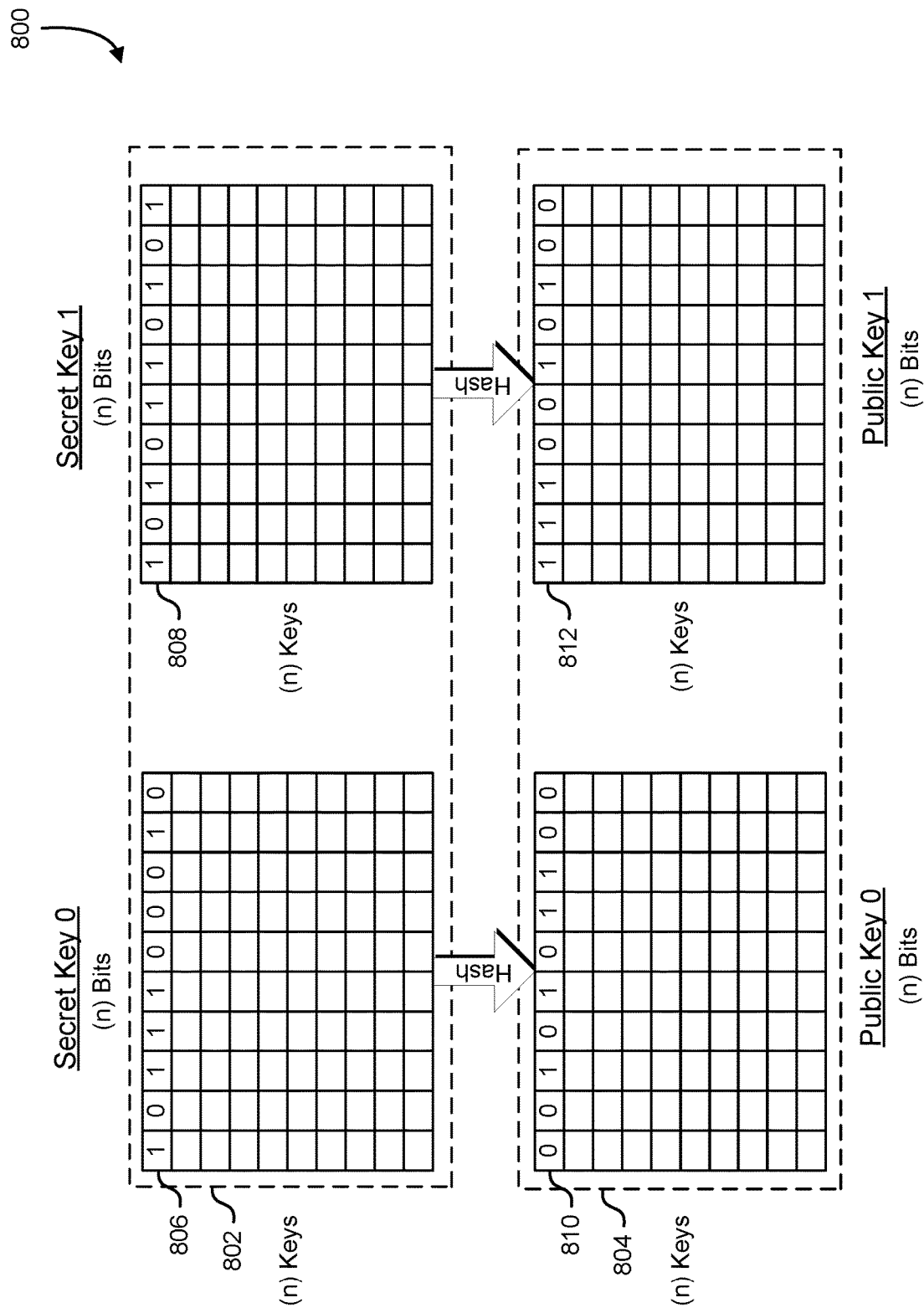
FIG. 8 shows an illustrative example of a one-time-use cryptographic key that includes secret key pairs and corresponding public key pairs.

FIG. 8 shows an illustrative example of a one-time-use cryptographic key that includes secret key pairs and corresponding public key pairs. A diagram 800 shows a one-time-use key that is generated by a signature authority. The one-time-use key is comprised of a secret key pair 802 and a public key pair 804. The secret key pair 802 includes a first secret key 806 and a second secret key 808. The first secret key 806 and the second secret key 808 each consist of a number (n) of n-bit keys. In some implementations, the first secret key 806 and the second secret key 808 are random numbers generated by the signature authority. In other implementations, the signature authority generates the first secret key 806 and the second secret key 808 from a secret seed value using a key derivation function ("KDF"). In some implementations, the secret seed value is itself generated from another secret seed value managed by the signature authority or owned by a superior signature authority.

The public key pair 804 includes a first public key 810 and a second public key 812. The first public key 810 and the second public key 812 each include a number (n) of n-bit hashes that correspond to the keys of the first secret key 806 and the second secret key 808. Each n-bit key of the secret key pair 802 is used to generate a corresponding n-bit hash of the public key pair 804. For example, the hash of the first key of the first secret key 806 is the first hash of the first public key 810. Each hash is generated with a cryptographic hash function or one-way function $h(x)=y$ where y is easy to calculate for a given x, but x is computationally difficult to calculate for a given y. In some examples, SHA256, MD5, BLAKE, or BLAKE2 hash functions are used to generate the hashes. The public key pair 804 is published by the signature authority.

Figure 9:
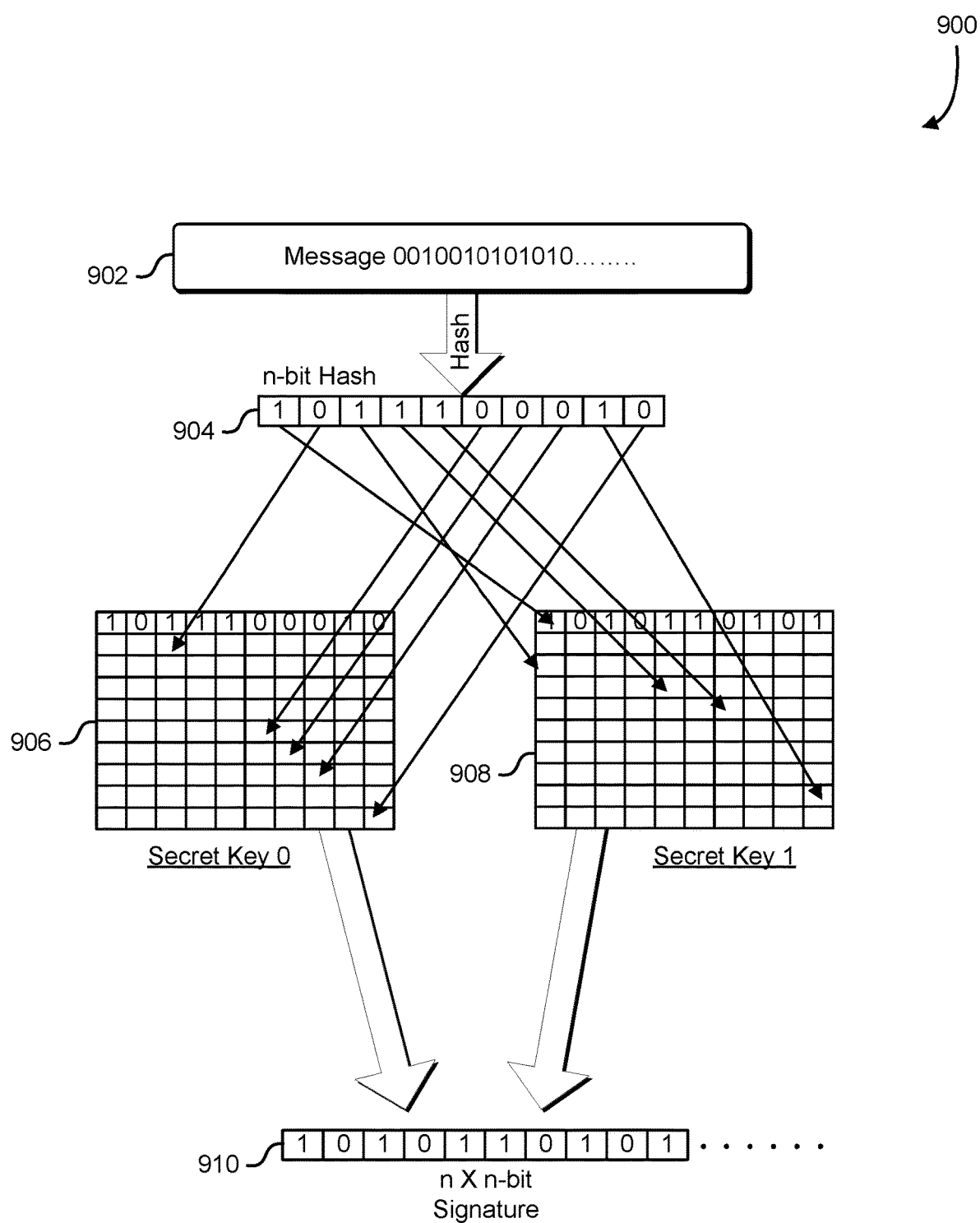
FIG. 9 shows an illustrative example of signing a message with a one-time-use cryptographic key.

FIG. 9 shows an illustrative example of signing a message with a one-time-use cryptographic key. A diagram 900 illustrates the signing of a message 902 by a signature authority using a one-time-use key. In various examples, the message 902 may be a network packet, digital certificate, transactional record, media file, legal document, or other message submitted for signing by a requester. The signature authority receives the message 902 from the requester and determines an n-bit message hash 904 using a cryptographic hash function or other one-way function. A one-way function or cryptographic hash has the property that for a given input, a hash value is relatively easy to calculate, but for a given hash value, an input that produces the given hash value is comparatively difficult. In various examples, cryptographic hash functions such as SHA-256, MD-5, or BLAKE may be used as the cryptographic hash function.

To sign the message 902, the signature authority selects a one-time-use key for use in generating the digital signature. In some examples, if the signature authority has exhausted the supply of one-time-use keys, the signature authority reports an error and does not sign the message 902. In other examples, if the signature authority has used the supply of one-time-use keys, a key may be selected for reuse. A particular cryptographic key may be selected for reuse based at least in part on the number of times the particular key has been reused and the particular secret keys used to generate previous signatures. In some implementations, the signature authority maintains a key-use database that records the number of times each key has been used, and the digital signature generated with each key. In some examples, to locate a key for reuse, the signature authority may locate those keys that have been used the least number of times to generate digital signatures. In another example, the signature authority is provided with the message to be signed, and the signature authority identifies a cryptographic key for reuse that, when generating a digital signature for the message, reveals the lowest number of additional secret key portions of the available reusable cryptographic keys.

The one-time-use key includes a secret key pair that includes a first secret key 906 and a second secret key 908. For each bit (m) of the n-bit message hash 904, the signature authority selects either the m'th key from the first secret key if the bit is a zero bit, or the m'th key from the second secret key if the bit is a one bit. The selected keys are concatenated to form a digital signature 910 having n-squared bits. The digital signature 910 is provided to the requester. In addition to the digital signature 910, the requester is provided with public key information associated with the selected one-time-use key to support the verification of the digital signature 910. The public key information may include one or more hashes of a hash tree or Merkle tree that link the public key information to a public key of the signature authority. For each bit of the n-bit message hash 904, a secret key is chosen from either the first secret key 906 or the second secret key. For 'zero' bits of the n-bit message hash 904, a secret key corresponding to the bit in the n-bit message hash is selected from the first secret key 906. For 'one' bits of the n-bit message hash 904, a secret key corresponding to the bit in the n-bit message hash is selected from the second secret key 908. The bit position within the n-bit message hash 904 corresponds to the row (key number) within either the first secret key 906 or second secret key 908. In the example shown in FIG. 9, for each bit of the n-bit message hash, an arrow indicates the row of the particular secret key (having n-bits) which is added to the resulting digital signature 910.

Figure 10:
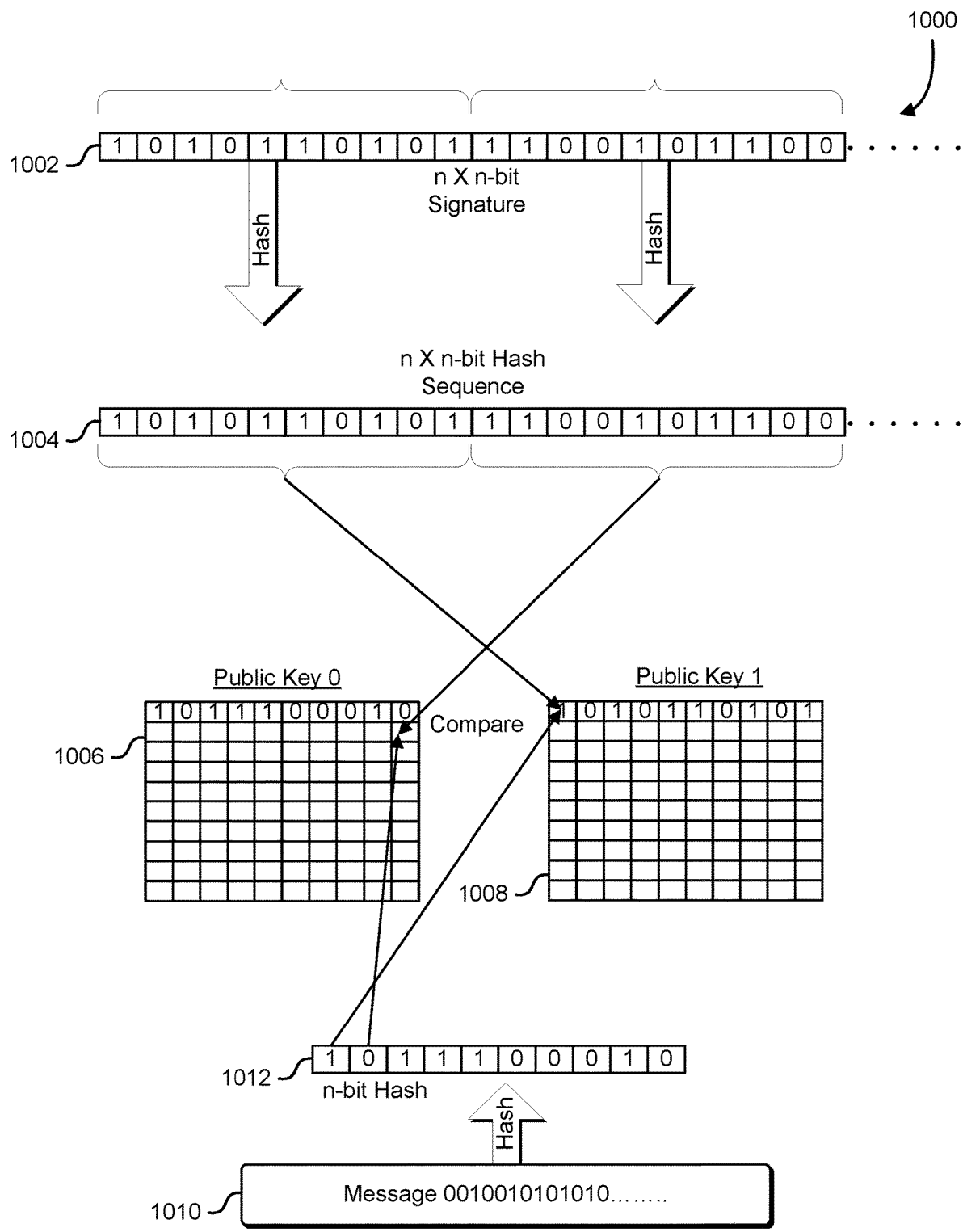
FIG. 10 shows an illustrative example of verifying a message with a one-time-use cryptographic key.

FIG. 10 shows an illustrative example of verifying a message with a one-time-use cryptographic key. A diagram 1000 illustrates how a recipient of a signed message is able to verify a digital signature. To verify the signed message, the recipient separates a digital signature 1002 from the signed message. The digital signature 1002 has n-squared bits, and the recipient divides the digital signature 1002 into n-key portions of n-bits each. The recipient determines a hash of each key portion and assembles the hashes into a hash sequence 1004 of n, n-bit hashes.

Using information provided with the digital signature, the recipient identifies the particular one-time-use-key used to generate the digital signature and requests related public key information from a signature authority. The signature authority provides the recipient with a public key pair corresponding to the one-time-use key used to generate the digital signature. The public key pair includes a first set of public keys 1006 and a second set of public keys 1008.

The recipient extracts a message body 1010 from the signed message and uses a cryptographic hash function to determine an n-bit message hash 1012 for the message body 1010. For each bit (m) of the n-bit message hash 1012, the recipient determines whether the bit is a one or zero. If the bit is a zero, the recipient compares the m'th key of the first set of public keys 1006 to the m'th hash of the hash sequence

1004. If the bit is a one, the recipient compares the m'th key of the second set of public keys 1008 to the m'th hash of the hash sequence 1004. If any of the comparisons do not match, the signature is not valid for the provided message. If the comparisons match, the signature is valid. In some implementations, additional verifications are performed to confirm that the public keys provided are in compliance with a Merkle tree or hash tree maintained by a signature authority. For each bit of the n-bit message hash 1012, a public key is chosen from either the first set of public keys 1006 or the second set of public keys 1008. For 'zero' bits of the n-bit message hash 1012, a public key corresponding to the bit in the n-bit message hash is selected from the first set of public keys 1006. For 'one' bits of the n-bit message hash 1012, a public key corresponding to the bit in the n-bit message hash 1012 is selected from the second set of public keys 1008. The bit position within the n-bit message hash 1012 corresponds to the row (key number) within either the first set of public keys 1006 or second set of public keys 1008. In the example shown in FIG. 10, for each bit of the n-bit message hash, an arrow indicates the row of the particular public key (having n-bits) that is compared to the hash sequence 1004.

Figure 11:
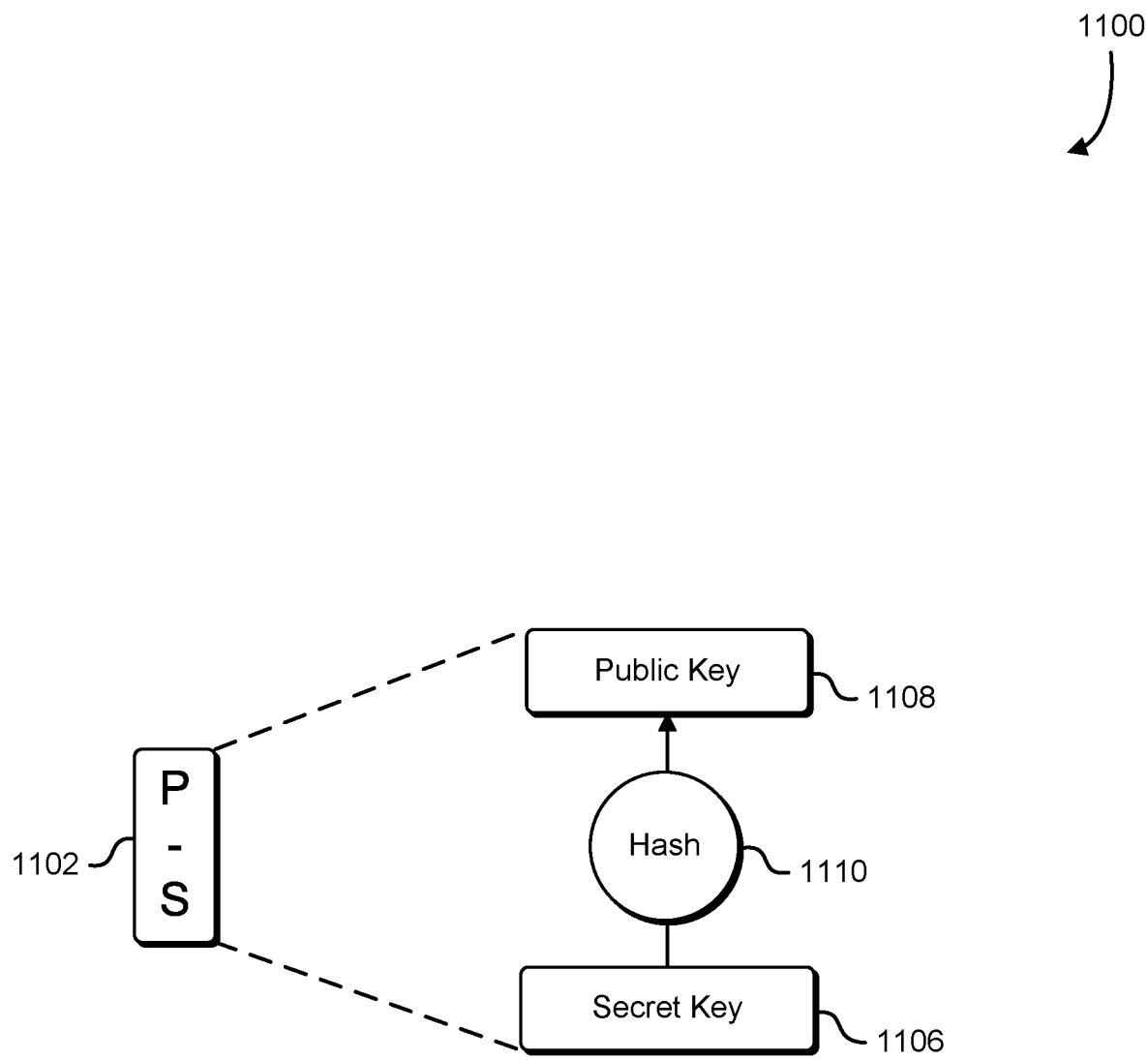
FIG. 11 shows an illustrative example of a secret key with an associated public key.

FIG. 11 shows an illustrative example of a secret key with an associated public key. A diagram 1100 shows a one-time-use cryptographic key 1102. The one-time-use cryptographic key 1102 comprises a secret key portion 1106 and a public key portion 1108 that is cryptographically derived from the secret key portion 1106 using a hash function 1110 such as a cryptographic hash or one-way function. In some examples, the public key portion is cryptographically derived from the secret key portion using a hash function such as a cryptographic hash or one-way function. In another example, the public key portion is cryptographically derived from the secret key portion using encryption. The one-time-use cryptographic key 1102 may be a key used in a Lamport signature scheme, a Winternitz signature scheme, or other one-time-use signature scheme using public and secret key pairs. In some implementations, the one-time-use cryptographic key 1102 is arranged in a hash tree, Merkle tree, or other structure where the public key portion 1108 is hashed with other public key portions of other one-time-use cryptographic keys into a single public key of a signature entity. In the following figures, the combination of the public key portion 1108 and the secret key portion 1106 may be represented as a public key/secret key pair.

Figure 12:
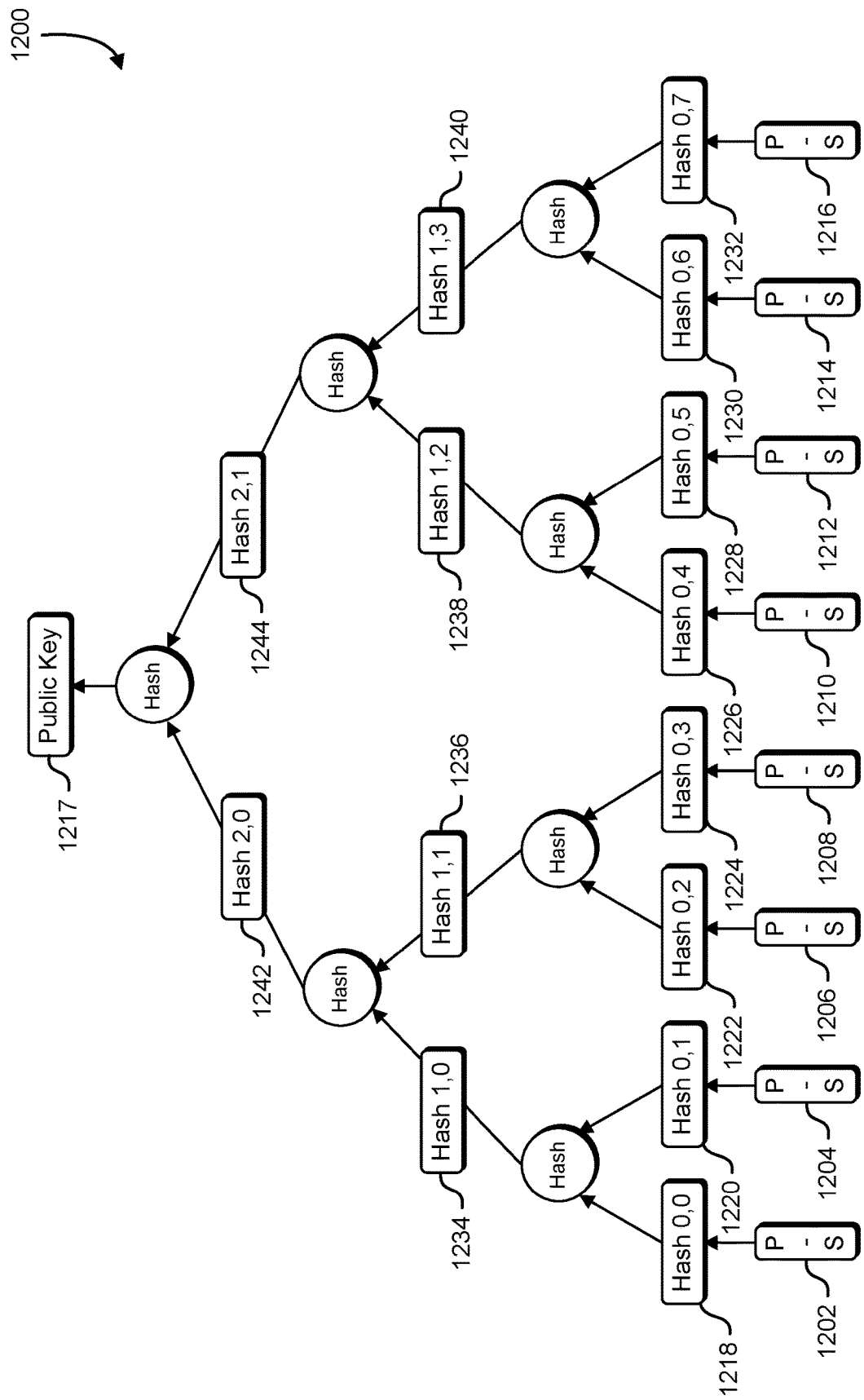
FIG. 12 shows an illustrative example of a Merkle tree of one-time-use cryptographic keys.

FIG. 12 shows an illustrative example of a Merkle tree of one-time-use cryptographic keys. A diagram 1200 shows a binary Merkle tree that links a collection of one-time-use cryptographic keys 1202, 1204, 1206, 1208, 1210, 1212, 1214, and 1216 to a public key 1217 associated with a signature authority. Each one-time-use cryptographic key is comprised of a secret key and a public key cryptographically derived from the secret key using a cryptographic hash. In some examples, the secret key consists of n-pairs of n-bit secret keys, and the public key consists of n-pairs of n-bit hashes that correspond to the n-bit secret keys. The public keys are published by the signature authority, and the secret keys are maintained by the signature authority for use in generating digital signatures. A collection of corresponding level-0 hash nodes 1218, 1220, 1222, 1224, 1226, 1228, 1230, and 1232 is generated from the public keys of the one-time-use cryptographic keys. In some examples, each level-0 hash node is generated by taking a cryptographic hash of a public key of an associated one-time-use cryptographic key.

The level-0 hash nodes are incorporated into the Merkle tree. Pairs of level-0 hash nodes are combined using a cryptographic hash function to generate a set of four level-1 hash nodes 1234, 1236, 1238, and 1240. In the example shown in FIG. 12, hash 0,0 and hash 0,1 are concatenated and hashed to generate hash 1,0. Hash 0,2 and hash 0,3 are concatenated and hashed to generate hash 1,1. Hash 0,4 and hash 0,5 are concatenated and hashed to generate hash 1,2. Hash 0,6 and hash 0,7 are concatenated and hashed to generate hash 1,3. The four level-1 hash nodes are combined to generate two level-2 hash nodes 1242 and 1244. In the example shown in FIG. 12, hash 1,0 and hash 1,1 are concatenated and hashed to generate hash 2,0, and hash 1,2 and hash 1,3 are concatenated and hashed to generate hash 2,1. The level-2 hash nodes 1242 and 1244 are combined and hashed to produce the public key 1217. The public key 1217 is published by the signature authority so that recipients of a digital signature are able to confirm that the signature was generated with a one-time-use cryptographic key that is linked to the Merkle tree.

A recipient of a digital signature validates the signature using the public key information associated with the one-time-use cryptographic key used to generate the digital signature. The public key information is validated against the public key 1217 that is associated with a signature authority. The signature authority provides the recipient of the digital signature with the hash value nodes of the Merkle tree that are necessary to re-create the public key 1217 from the public key information.

For example, if the one-time-use cryptographic key 1206 is used to generate the digital signature, the public key information associated with the one-time-use cryptographic key 1206 is used to confirm that the digital signature was created from the secret key associated with the one-time-use cryptographic key 1206. The level-0 hash node 1222 can be re-created by the recipient using the public key information associated with the one-time-use cryptographic key 1206. In addition to the public key 1217, the signature authority provides the level-0 hash node 1224, the level-1 hash node 1234, and the level-2 hash node 1244. The recipient uses the determined level-0 hash node 1222 and the provided level-0 hash node 1224 to generate the level-1 hash node 1236. The recipient uses the generated level-1 hash node 1236 and the provided level-1 hash node 1234 to generate the level-2 hash node 1242. The generated level-2 hash node 1242 and the provided level-2 hash node 1244 are used to generate the public key 1217. If the generated public key matches the published public key provided by the signature authority, the one-time-use cryptographic key 1206 is a valid member of the Merkle tree. If the generated public key does not match the published public key, the one-time-use cryptographic key 1206 is not a valid member of the Merkle tree.

Figure 13:
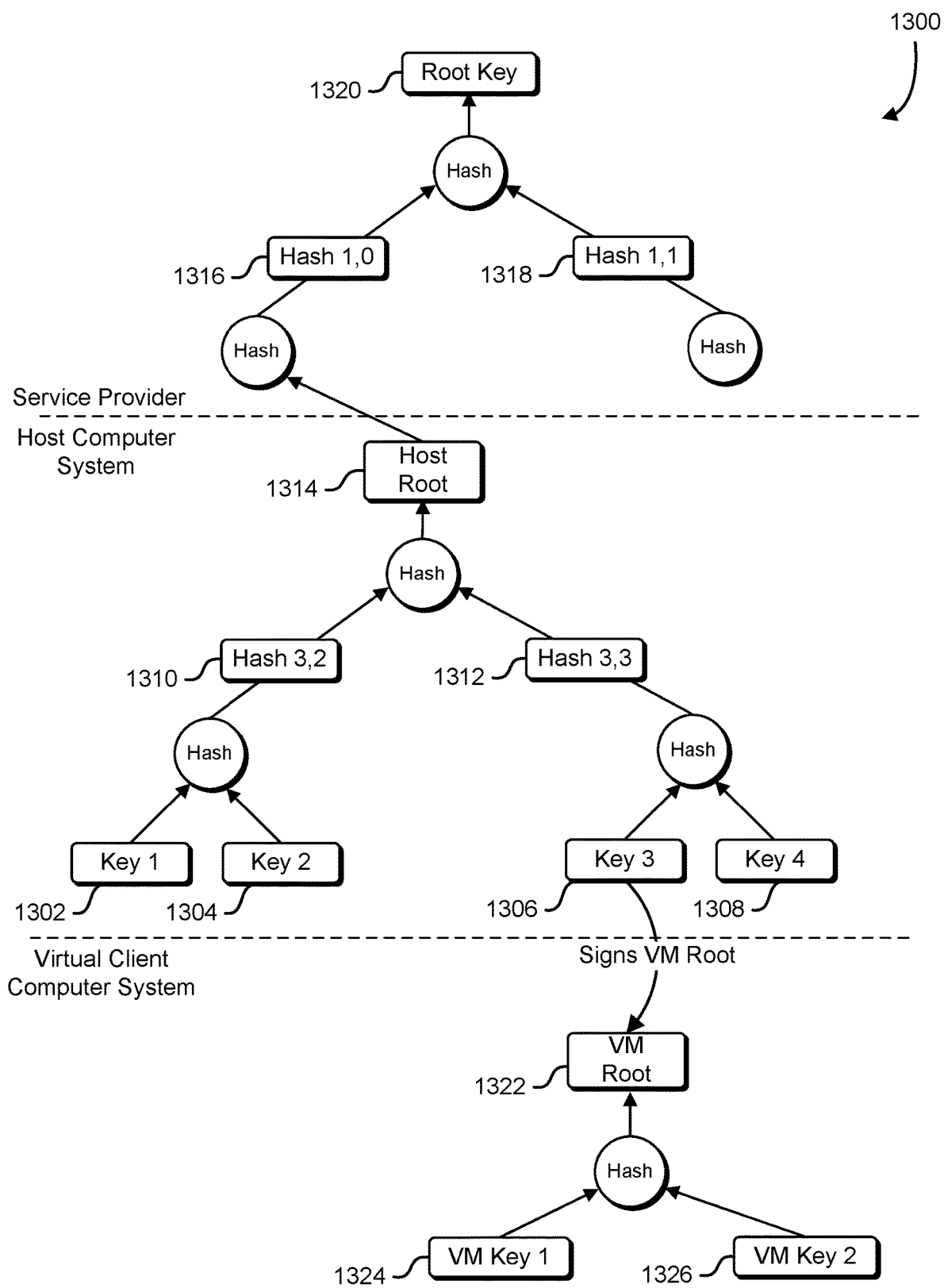
FIG. 13 shows an illustrative example of a number of linked Merkle trees that implement a cryptographic signature scheme for signing attestations.

FIG. 13 shows an illustrative example of a number of linked Merkle trees that implement a cryptographic signature scheme for signing attestations. A diagram 1300 shows a cryptographic signature scheme for signing attestations. A set of one-time-use cryptographic keys 1302, 1304, 1306, and 1308 is provided to a host computer system. The set of one-time-use cryptographic keys is arranged in a Merkle tree. A first one-time-use cryptographic key 1302 and a second one-time-use cryptographic key 1304 are combined and hashed to generate a first intermediate hash 1310. A third one-time-use cryptographic key 1306 and the second one-time-use cryptographic key 1308 are combined and hashed to generate a second intermediate hash 1312. The first intermediate hash 1310 and the second intermediate hash 1312 are combined and hashed to generate a host root hash 1314.

The host root hash 1314 and other host root hashes generated by other host computer systems are provided to a service provider and integrated into a service-provider hash tree. Hashes of the host computer systems including the host root hash 1314 are combined and hashed to generate a first service-provider intermediate hash 1316 and a second service-provider intermediate hash 1318. The first service-provider intermediate hash 1316 and the second service-provider intermediate hash 1318 are combined and hashed to generate a service-provider root key 1320. The service-provider root key 1320 is published by the service provider, which enables entities that receive digital signatures generated using the set of one-time-use cryptographic keys 1302, 1304, 1306, and 1308 to verify that the digital signatures have been generated by host computer systems authorized by the service provider.

Host computer systems that generate virtual computing environments such as virtual machines use one of the set of one-time-use cryptographic keys 1302, 1304, 1306, and 1308 to sign a Merkle tree of one-time-use cryptographic keys provided to each virtual computing environment managed by the host computer system. In some examples, the host computer system generates a Merkle tree of one-time-use cryptographic keys for the virtual computing environment, and provides the Merkle tree of one-time use cryptographic keys to the virtual computing environment. In another example, the host computer system causes the TPM on the host computer system to generate the Merkle tree of one-time-use cryptographic keys, and provides the virtual computing environment with a credential that allows the virtual computing environment to access the Merkle tree of one-time-use cryptographic keys on the TPM. In yet another example, the virtual computing environment generates the Merkle tree of one-time-use cryptographic keys and provides the root node of the Merkle tree of one-time-use cryptographic keys to the host computer system.

The host computer system, after confirming the validity of the virtual computing environment, signs a root node of the Merkle tree 1322 with one of the set of one-time-use cryptographic keys 1302, 1304, 1306 or 1308. The root node of the Merkle tree 1322 is published by the virtual computing environment. The one-time-use keys 1324 and 1326 may be used by the virtual computing environment to generate signed attestations which may be provided to applications, end users, or other entities.

A recipient of a digital signature generated with one of the one-time-use keys 1324 or 1326 is able to verify the digital signature against the service-provider root key 1320. The recipient first confirms that the digital signature is generated with one of the one-time-use cryptographic keys issued to the virtual computing environment by regenerating the hashes from the particular key to the root node of the Merkle tree 1322. The root node of the Merkle tree 1322 is signed by a one-time-use key controlled by the host computer system hosting the virtual computing environment. The recipient confirms the hashes between the particular one-time-use cryptographic key of the host computer system to the host root hash 1314. The Merkle tree controlled by the service provider links to the host root hash, so the recipient is able to continue to confirm hashes up to the service-provider root key 1320.

Figure 14:
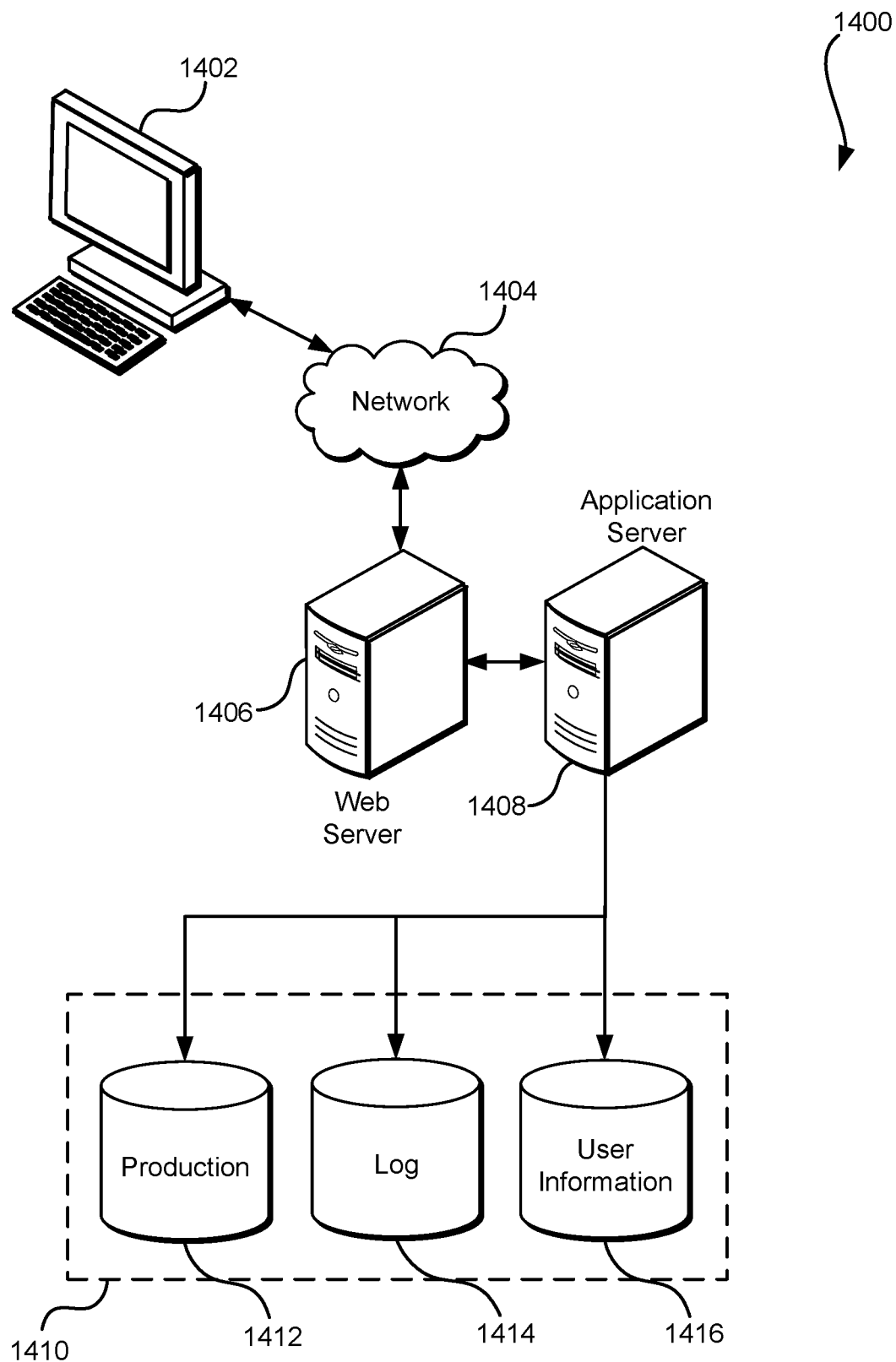
FIG. 14 illustrates an environment in which various embodiments can be implemented.

FIG. 14 illustrates aspects of an example environment 1400 for implementing aspects in accordance with various embodiments. As will be appreciated, although a web-based environment is used for purposes of explanation, different environments may be used, as appropriate, to implement various embodiments. The environment includes an electronic client device 1402, which can include any appropriate device operable to send and/or receive requests, messages, or information over an appropriate network 1404 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1402 and the application server 1408, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1410 can include several separate data tables, databases, data documents, dynamic data storage schemes and/or other data storage mechanisms and media for storing data relating to a particular aspect of the present disclosure. For example, the data store illustrated may include mechanisms for storing production data 1412 and user information 1416, which can be used to serve content for the production side. The data store also is shown to include a mechanism for storing log data 1414, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update, or otherwise process data in response thereto. The application server 1408 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1402. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Example cryptographic algorithms include block ciphers and the various modes that utilize initialization vectors, such as the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, and Galois/Counter (GCM) mode.

As discussed, numerous variations utilize symmetric and/or asymmetric cryptographic primitives. Symmetric key algorithms may include various schemes for performing cryptographic operations on data including block ciphers, stream ciphers, and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA), and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs)

that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that f(x)=y is below a specified threshold), second preimage resistance (given an input x1, the probably of randomly generating another input x2, different from x1, such that f(x1)=f(x2) is below a specified threshold) and/or collision resistance (the probability of two different inputs resulting in the same output is less than a specified threshold). The exact threshold for each probability may be context-dependent, with lower probabilities corresponding to higher security contexts. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a signed attestation by an application deployed in a virtual computing environment, wherein the signed attestation comprises a value derived at least in part from a configuration of the virtual computing environment;
   verifying that the configuration of the virtual computing environment is one of a number of approved configurations using the signed attestation;
   confirming that a first digital signature on the signed attestation is generated under an authority of the virtual computing environment by cryptographically verifying the first digital signature against a public key of the virtual computing environment, the virtual computing environment hosted by a host computer system and managed by a service provider;
   confirming that the public key of the virtual computing environment is signed using a one-time-use cryptographic key associated with the host computer system by cryptographically verifying a second digital signature on the public key of the virtual computing environment against a public key of the host computer system; and
   confirming that the host computer system is signing under the authority of the service provider by cryptographically verifying the public key of the host computer system against a public key of the service provider.

2. The computer-implemented method of claim 1, wherein cryptographically verifying the first digital signature against the public key of the virtual computing environment further comprises:
   verifying the first digital signature against a public part of a one-time-use cryptographic key;
   generating a hash of the public part of the one-time-use cryptographic key; and
   cryptographically verifying the hash against the public key of the virtual computing environment using a hash tree published by the virtual computing environment, wherein the public key of the virtual computing environment comprises a root of the hash tree.

3. The computer-implemented method of claim 1, wherein cryptographically verifying the second digital signature on the public key of the virtual computing environment against the public key of the host computer system further comprises:
   verifying the second digital signature against a public part of another one-time-use cryptographic key controlled by the host computer system;
   generating a hash of the public part of the other one-time-use cryptographic key; and
   cryptographically verifying the hash against the public key of the host computer system using a published hash tree, wherein the public key of the host computer system comprises a root of the published hash tree.

4. The computer-implemented method of claim 1, wherein cryptographically verifying the public key of the host computer system against the public key of the service provider further comprises:
generating a hash of the public key of the host computer system; and
cryptographically verifying the hash against the public key of the service provider using a hash tree published by the service provider by verifying that the hash tree published by the service provider properly chains up to the public key of the service provider.

5. A system, comprising:
a service provider computer system;
a fleet of host computer systems managed by the service provider computer system, wherein at least one host computer system of the fleet of host computer systems hosts a virtual computing environment deploying an application, wherein the application:
receives a signed attestation from the virtual computing environment in response to a request for the signed attestation;
confirms that a first digital signature on the signed attestation is generated under an authority of the virtual computing environment by cryptographically verifying the first digital signature against a public key of the virtual computing environment;
confirms that the public key of the virtual computing environment is signed using a cryptographic key associated with the at least one host computer system by cryptographically verifying a second digital signature on the public key of the virtual computing environment against a public key of the at least one host computer system; and
confirms that the at least one host computer system is signing under the authority of the service provider computer system by cryptographically verifying the public key of the at least one host computer system against a public key of the service provider.

6. The system of claim 5, wherein the application to cryptographically verify the first digital signature against the public key of the virtual computing environment further:
verifies the first digital signature against a public part of a one-time-use cryptographic key;
generates a hash of the public part of the one-time-use cryptographic key; and
cryptographically verifies the hash against the public key of the virtual computing environment using a hash tree published by the virtual computing environment.

7. The system of claim 5, wherein the application to cryptographically verify the second digital signature on the public key of the virtual computing environment against the public key of the host computer system further:
verifies the second digital signature against a public part of another one-time-use cryptographic key controlled by the host computer system;
generates a hash of the public part of the other one-time-use cryptographic key; and
cryptographically verifies the hash against the public key of the host computer system using a published hash tree.

8. The system of claim 5, wherein the application to cryptographically verify the public key of the host computer system against the public key of the service provider further:
generates a hash of the public key of the host computer system; and
cryptographically verifies the hash against the public key of the service provider using a hash tree published by the service provider.

9. The system of claim 5, wherein the attestation is a value derived at least in part from a configuration of the virtual computing environment; and wherein the application verifies that the configuration of the virtual computing environment is one of a number of approved configurations using the attestation.

10. The system of claim 5, wherein the attestation includes information that describes a virtual runtime on the host computer system; and wherein the application verifies that a configuration of the virtual runtime is one of a number of approved configurations using the attestation.

11. The system of claim 5, wherein the attestation is based at least in part on a configuration of the service provider; and wherein the application verifies that the configuration of the service provider is one of a number of approved configurations using the attestation.

12. The system of claim 5, wherein the virtual computing environment is a container runtime, virtual machine, or serverless computing service.

13. A non-transitory computer-readable storage medium comprising executable instructions that, as a result of being executed by one or more processors of a computer system, cause the computer system to at least:
receive a signed attestation;
confirm that a first digital signature on the signed attestation is generated under an authority of a virtual computing environment by cryptographically verifying the first digital signature against a public key of the virtual computing environment, the virtual computing environment hosted by a host computer system and managed by a service provider;
confirm that the public key of the virtual computing environment is signed using a one-time-use cryptographic key associated with the host computer system by cryptographically verifying a second digital signature on the public key of the virtual computing environment against a public key of the host computer system; and
confirm that the host computer system is signing under the authority of the service provider by cryptographically verifying the public key of the host computer system against a public key of the service provider.

14. The non-transitory computer-readable storage medium of claim 13, wherein the instructions that cause the computer system to cryptographically verify the first digital signature against the public key of the virtual computing environment further include instructions that cause the computer system to:
verify the first digital signature against a public part of a one-time-use cryptographic key;
generate a hash of the public part of the one-time-use cryptographic key; and
cryptographically verify the hash against the public key of the virtual computing environment using a hash tree published by the virtual computing environment.

15. The non-transitory computer-readable storage medium of claim 13, wherein the instructions that cause the computer system to cryptographically verify the second digital signature on the public key of the virtual computing environment against the public key of the host computer system further include instructions that cause the computer system to:

verify the second digital signature against a public part of another one-time-use cryptographic key controlled by the host computer system;

generate a hash of the public part of the other one-time-use cryptographic key; and cryptographically verify the hash against the public key of the host computer system using a published hash tree.

16. The non-transitory computer-readable storage medium of claim 13, wherein the instructions that cause the computer system to cryptographically verify the public key of the host computer system against the public key of the service provider further include instructions that cause the computer system to:

generate a hash of the public key of the host computer system; and cryptographically verify the hash against the public key of the service provider using a hash tree published by the service provider.

17. The non-transitory computer-readable storage medium of claim 13, wherein the signed attestation is signed with a Lamport or Winternitz key.

18. The non-transitory computer-readable storage medium of claim 13, wherein:

the attestation is a value derived at least in part from a configuration of the virtual computing environment; and the instructions further comprise instructions that, as a result of being executed by the one or more processors, cause the computer system to verify that the configuration of the virtual computing environment is one of a number of approved configurations using the attestation.

19. The non-transitory computer-readable storage medium of claim 13, wherein:

the attestation includes information that describes a virtual runtime on the host computer system; and the instructions further comprise instructions that, as a result of being executed by the one or more processors, cause the computer system to verify that a configuration of the virtual runtime is one of a number of approved configurations using the attestation.

20. The non-transitory computer-readable storage medium of claim 13, wherein:

the attestation is based at least in part on a configuration of the service provider; and the instructions further comprise instructions that, as a result of being executed by the one or more processors, cause the computer system to verify that the configuration of the service provider is one of a number of approved configurations using the attestation.

* * * * *